(12) United States Patent
Tokuchi

(10) Patent No.: US 11,415,938 B2
(45) Date of Patent: Aug. 16, 2022

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/051,557

(22) Filed: Aug. 1, 2018

(65) Prior Publication Data

US 2019/0227491 A1 Jul. 25, 2019

(30) Foreign Application Priority Data

Jan. 23, 2018 (JP) .............................. JP2018-009007

(51) Int. Cl.
| | | |
|---|---|---|
| *G02B 5/32* | (2006.01) | |
| *G03H 1/22* | (2006.01) | |
| *G02B 27/00* | (2006.01) | |
| *G06Q 30/02* | (2012.01) | |
| *G02B 30/56* | (2020.01) | |
| *G02B 30/60* | (2020.01) | |

(52) U.S. Cl.
CPC ....... *G03H 1/2205* (2013.01); *G02B 27/0093* (2013.01); *G02B 30/56* (2020.01);
(Continued)

(58) Field of Classification Search
CPC ................... G03H 1/22; G03H 1/2205; G03H 2001/2223; G03H 2001/2231; G03H 2001/2234; G03H 2001/2252; G03H 2001/226; G03H 2001/2273; G03H 2001/2292; G03H 2226/00; G03H 2226/05; G03H 2223/50; G03H 2227/00–03; G02B 30/50; G02B 30/56; G02B 30/60; G02B 27/0093; G02B 27/18; G02B 5/12–124; G06Q 30/0261; G06Q 30/0251; G06Q 30/0241; G06F 3/011; G06F 3/013; G06F 3/04815; G06F 3/0426; G06F 3/0447; G06T 19/006; G09G 2354/00;
(Continued)

(56) References Cited

U.S. PATENT DOCUMENTS 8,854,424 B2 * 10/2014 Tsang ..................... G02B 30/00
348/40
9,489,724 B2 * 11/2016 Davies ................. H04N 13/363
(Continued)

FOREIGN PATENT DOCUMENTS

| JP | 2013-109421 A | 6/2013 |
|---|---|---|
| JP | 2014-157482 A | 8/2014 |

(Continued)

OTHER PUBLICATIONS

Jan. 5, 2022 Office Action issued in Japanese Patent Application No. 2018-009007.

*Primary Examiner* — Stephone B Allen
*Assistant Examiner* — Jyotsna V Dabbi
(74) *Attorney, Agent, or Firm* — Oliff PLC

(57) ABSTRACT

An information processing apparatus includes a detector that detects a direction of movement of a user relative to an image formed in an air, and a controller that controls formation of the image based on the detected direction.

8 Claims, 40 Drawing Sheets

(52) U.S. Cl.
CPC .......... *G02B 30/60* (2020.01); *G06Q 30/0261* (2013.01); *G03H 2001/2223* (2013.01); *G03H 2226/05* (2013.01)

(58) Field of Classification Search
CPC ....... H04N 13/366–383; H04N 13/388; H04N 13/39; H04N 13/393; H04N 2013/40; H04N 2013/405
USPC .......................................................... 359/15
See application file for complete search history.

(56) References Cited

U.S. PATENT DOCUMENTS 9,778,738 B2   10/2017   Sugimoto et al.

| | | | |
|---|---|---|---|
| 2006/0262411 A1* | 11/2006 | Dunn | G02B 30/27 359/619 |
| 2012/0039507 A1* | 2/2012 | Ikenoue | G06K 9/00362 382/103 |
| 2014/0168210 A1* | 6/2014 | Bromer | G02B 30/56 345/419 |
| 2015/0138613 A1* | 5/2015 | Choo | G03H 1/2202 359/9 |
| 2015/0145969 A1* | 5/2015 | Kim | H04N 13/305 348/51 |
| 2019/0043245 A1* | 2/2019 | Ogata | G06T 15/20 |

FOREIGN PATENT DOCUMENTS

| | | | | |
|---|---|---|---|---|
| JP | 2017-062709 A | | 3/2017 | |
| KR | 20160023015 A | * | 3/2016 | ............ G06F 3/017 |
| WO | 2016/047173 A1 | | 3/2016 | |
| WO | WO-2017141511 A1 | * | 8/2017 | ............ H04N 7/141 |

* cited by examiner

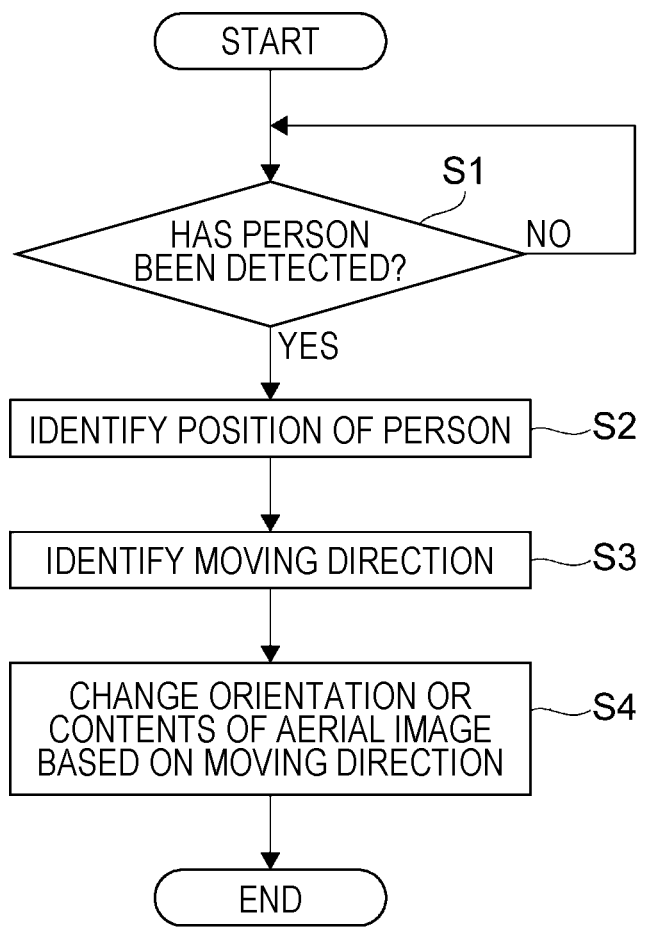

TIME T1

TIME T2

TIME T3

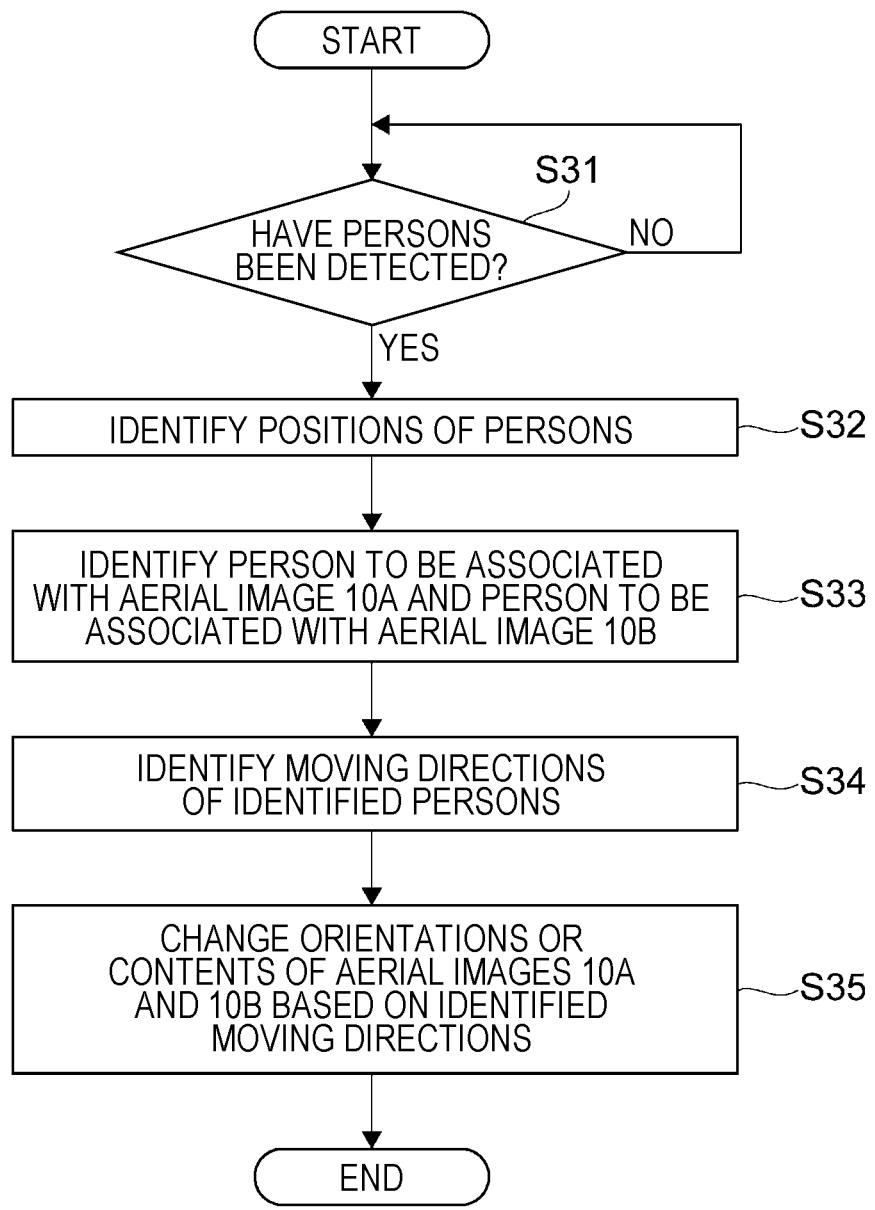

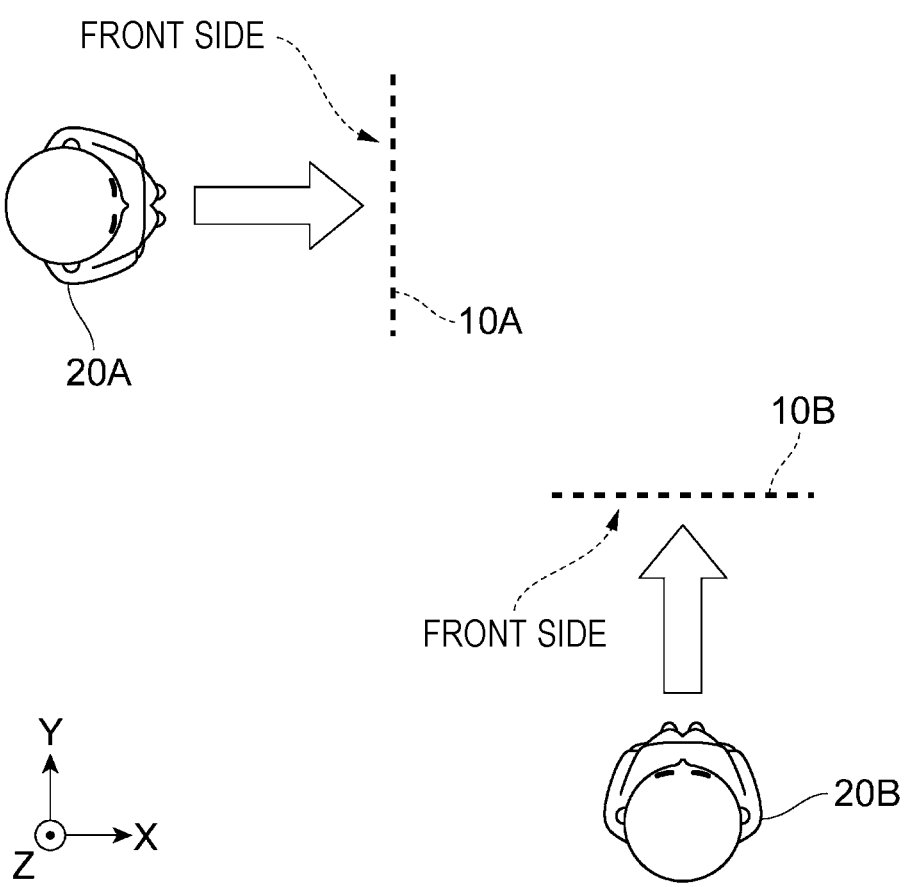

FIG. 25A
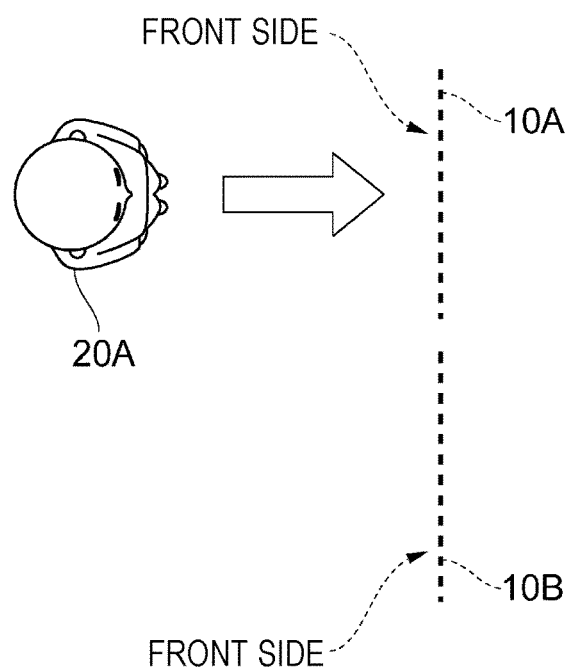
FIG. 25B
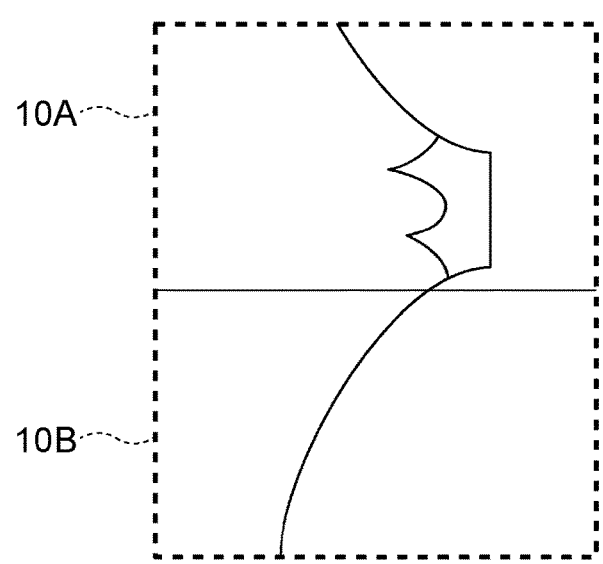
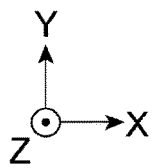
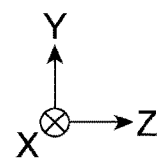

FIG. 37
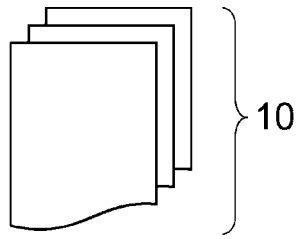
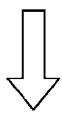
W1
■ OUTPUT INSTRUCTION SETTING
PLEASE SELECT OUTPUT INSTRUCTION
OUT OF THE 2 ITEMS BELOW.
· OUTPUT AS ELECTRONIC FILE
· PRINT ON PAPER
IF YOU NEED MORE OPTIONS,
PLEASE CLICK "NEXT" BUTTON BELOW.
NEXT
 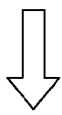 
100
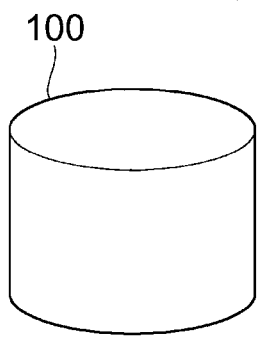
101
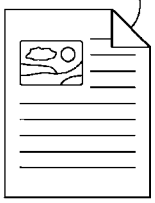
W2
■ OUTPUT INSTRUCTION SETTING
PLEASE SELECT OUTPUT INSTRUCTION
OUT OF THE 2 ITEMS BELOW.
· OUTPUT AS THREE-DIMENSIONAL OBJECT
· PRINT AS PANORAMA FIG. 38
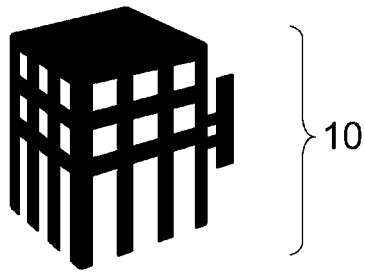
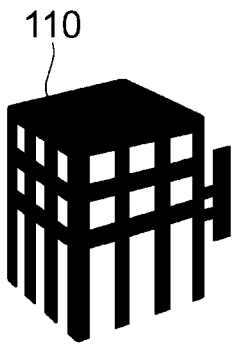

FIG. 40
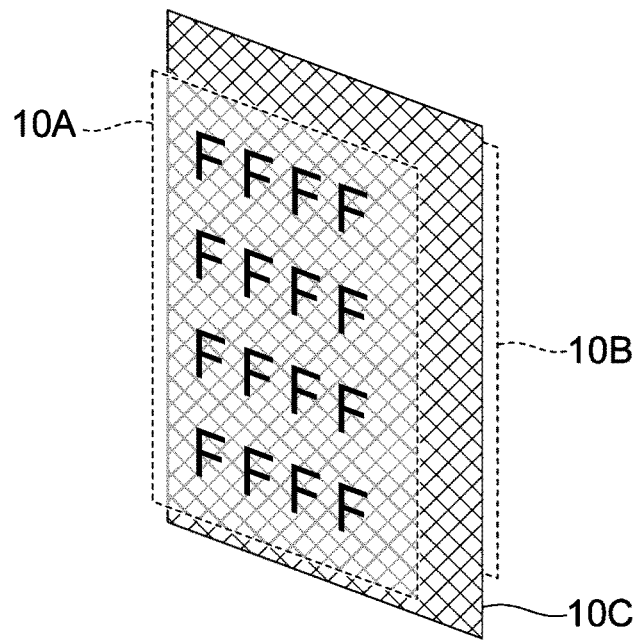
PRINT WITHOUT 10C
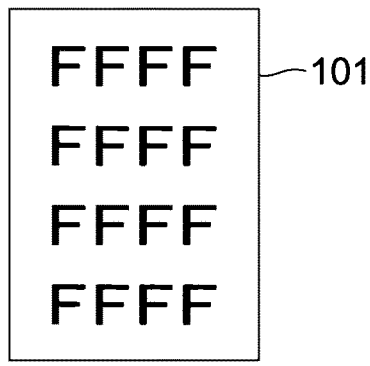
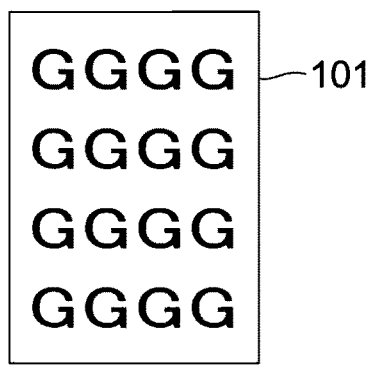
PRINT WITH 10C
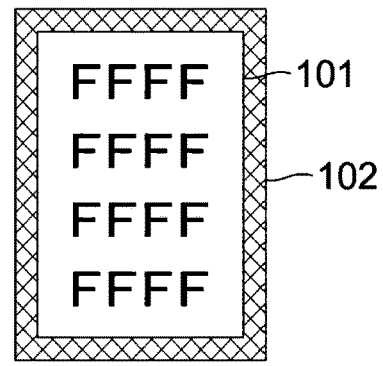
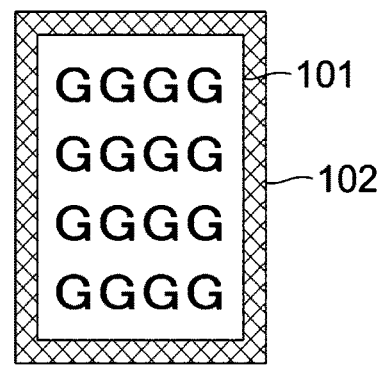

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-009007 filed Jan. 23, 2018.

BACKGROUND

(i) Technical Field

The present invention relates to an information processing apparatus, an information processing system, and a non-transitory computer readable medium storing a program.

(ii) Related Art

There is a technology in which light beams are crossed in the air to form an image at the intersection of the light beams. The image displayed by using this type of technology is also referred to as an aerial image.

SUMMARY

According to an aspect of the invention, there is provided an information processing apparatus including a detector that detects a direction of movement of a user relative to an image formed in an air, and a controller that controls formation of the image based on the detected direction.

BRIEF DESCRIPTION OF THE DRAWINGS

Exemplary embodiments of the present invention will be described in detail based on the following figures, wherein:

FIGS. 2A and 2B illustrate the principle of an aerial image forming apparatus that forms an aerial image by causing light beams output from a display device to pass through a dedicated optical plate, in which FIG. 2A illustrates a positional relationship between each member and the aerial image and FIG. 2B illustrates a part of the sectional structure of the optical plate;

FIGS. 4A and 4B illustrate the principle of an aerial image forming apparatus that forms the aerial image by using a micromirror array having a structure in which minute rectangular holes that constitute a dihedral corner reflector are arrayed in a plane at regular intervals, in which FIG. 4A illustrates a positional relationship between each member and the aerial image and FIG. 4B is an enlarged view of a part of the micromirror array;

FIG. 9 is a flowchart for describing an overview of a processing operation to be executed by an image formation control part according to the first exemplary embodiment;

FIGS. 10A to 10C illustrate an example in which the formation of the aerial image is controlled so that the aerial image faces a person, in which FIG. 10A illustrates a position of the aerial image when the person moves in a direction 1, FIG. 10B illustrates a position of the aerial image when the person moves in a direction 2, and FIG. 10C illustrates a position of the aerial image when the person moves in a direction 3;

FIGS. 11A and 11B illustrate another example in which the formation of the aerial image is controlled so that the aerial image faces the person, in which FIG. 11A illustrates a position of the aerial image when the person moves in the direction 2 and FIG. 11B illustrates a position of the aerial image when the person moves in a direction 4;

FIGS. 12A to 12C illustrate an example in which the aerial image is formed when the person moves in one direction through an area located away from the aerial image, in which FIG. 12A illustrates a relationship between the aerial image and the position of the person at a time T1, FIG. 12B illustrates a relationship between the aerial image and the position of the person at a time T2, and FIG. 12C illustrates a relationship between the aerial image and the position of the person at a time T3;

FIG. 23 is a flowchart for describing an overview of a processing operation to be executed by image formation control parts;

FIG. 24 illustrates an example of formation of aerial images in the fourth exemplary embodiment;

FIGS. 25A and 25B illustrate another example of the formation of the aerial images in the fourth exemplary embodiment, in which FIG. 25A is a top view of a space where the aerial images are formed and FIG. 25B illustrates the aerial images viewed from the position of a person;

FIGS. 26A and 26B illustrate another example of the formation of the aerial images in the fourth exemplary embodiment, in which FIG. 26A illustrates a state in which two persons are located across two aerial images so as to face each other and FIG. 26B is a top view of a space where the aerial images are formed;

FIGS. 27A and 27B illustrate an example of a measure to increase the visibility, in which FIG. 27A is a top view of a space where the aerial images are formed and FIG. 27B illustrates how the aerial images are viewed from persons;

FIGS. 28A and 28B illustrate other examples of arrangement of a third aerial image for increasing the visibility of each of the aerial images, ins which FIG. 28A illustrates an example in which plural aerial images are arranged between two aerial images and FIG. 28B illustrates an example in which an aerial image is arranged between an aerial image and a plant that is recognized as a background;

FIG. 37 illustrates an example of execution of an output operation when an aerial image shows a document;

FIG. 38 illustrates an example of execution of an output operation when the aerial image shows a three-dimensional object;

FIG. 40 illustrates an example of an operation when the output operation for the aerial images is printing on paper.

DETAILED DESCRIPTION

Exemplary embodiments of the present invention are described below with reference to the drawings.

First Exemplary Embodiment

Schematic Configuration of Aerial Image Forming System

Figure 1:
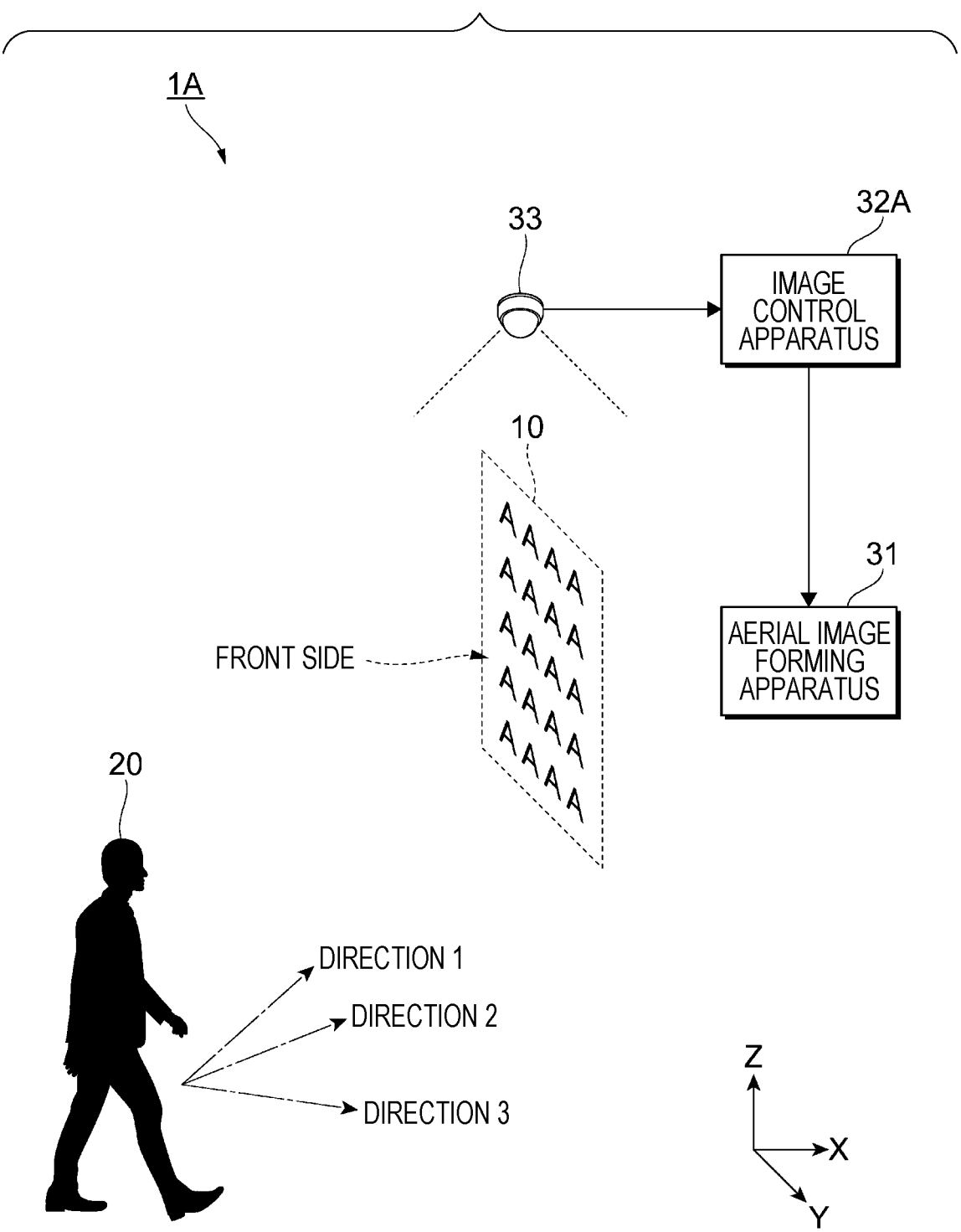
FIG. 1 illustrates the schematic configuration of an aerial image forming system according to a first exemplary embodiment.

FIG. 1 illustrates the schematic configuration of an aerial image forming system 1A according to a first exemplary embodiment. The aerial image forming system 1A is an example of an information processing system.

In this exemplary embodiment, an aerial image 10 is an image formed in the air so as to reproduce the state of light that is equivalent to light reflected from an object.

The aerial image 10 is formed so as to float in the air and therefore a person may pass through the aerial image 10.

For example, the aerial image 10 shows a guidance or advertisement screen. For example, the aerial image 10 shows an operation screen for changing display contents in response to an operation performed by a person 20. Those screens are examples.

The aerial image 10 may show a moving image as well as a still image.

In each exemplary embodiment, the entire rectangle is rendered as the aerial image 10 but the shape that defines the outer edge of the aerial image 10 is not limited to the rectangle and any other shape may be used. For example, a space where an image of an object is formed may be set as the entire space where the aerial image 10 is formed. For example, an image of an operation button, an image of a person, an image of an animal, an image of a product, and an image of a fruit are examples of the aerial mage 10. In FIG. 1, the shape of the aerial image 10 is a planar shape but may be a three-dimensional shape such as a curved shape, a spherical shape, or a cubic shape.

At present, the aerial image 10 is formed at a position specified in advance and at an angle specified in advance. Therefore, the person 20 needs to adjust his or her position to the formed aerial image 10.

In this exemplary embodiment, this relationship is reversed and the position and the angle of formation of the aerial image 10 are adjusted to the position of the person 20. In this exemplary embodiment, the display contents and the way to display the contents are also changed as necessary.

The aerial image forming system 1A illustrated in FIG. 1 includes an aerial image forming apparatus 31 that forms the aerial image 10 in the air, an image control apparatus 32A that controls the aerial image forming apparatus 31, and a position detecting sensor 33 that detects the position of the person 20.

The aerial image forming apparatus 31 is an example of an image forming unit. The image control apparatus 32A is an example of a controller. The image control apparatus 32A is also an example of an information processing apparatus. The position detecting sensor 33 is an example of a detector.

The image control apparatus 32A controls the formation of the aerial image 10 based on a moving direction of the person 20 (for example, a direction 1, a direction 2, or a direction 3) to increase the visibility of the aerial image 10. In other words, the image control apparatus 32A controls the position and the orientation of the formation of the aerial image 10 based on the movement of the person 20 to prevent a decrease in the visibility.

The image control apparatus 32A acquires the position of the person 20 based on a signal output from the position detecting sensor 33 and acquires an approaching direction of the person 20 through a history of the identified position of the person 20. The position of the person 20 need not be identified as precise coordinates but may be identified roughly.

The image control apparatus 32A controls the formation of the aerial image 10 so that the front side of the aerial image 10 is displayed for a specific person 20.

For example, the front side is a side where characters are recognized in a proper direction or a face is observed with its sides positioned properly. When the aerial image 10 is a three-dimensional image, the front side is a side where a surface defined as the front surface of the three-dimensional image is observed.

The position detecting sensor 33 is arranged so as to detect the person 20 who moves around the aerial image 10. The aerial image 10 may be formed ahead of a corner of a walkway and therefore the position where the position detecting sensor 33 is arranged is not limited to a space where the aerial image 10 may be recognized straight ahead. The number of position detecting sensors 33 is not limited to one but plural position detecting sensors 33 may be provided.

As the position detecting sensor 33, for example, a thermopile infrared sensor, a pyroelectric infrared sensor, a sensor that detects the presence or absence of an object that interrupts an infrared ray or the like (so-called optical sensor), an acoustic sensor that detects an object through a response of sound, a sensor that detects a load on a floor or mat, or an image capturing camera that captures an image of the person 20 who moves around the aerial image 10 may be employed depending on purposes and the arrangement space.

The position detecting sensor 33 may have a function of measuring a distance to the person 20. A sensor that measures a distance to the person 20 may be prepared separately from the position detecting sensor 33.

To measure a distance, for example, there may be used an optical method for measuring a distance through light reflection on an object, an ultrasonic method that uses an ultrasonic wave of 20 kHz or higher, a method for determining a distance by using parallax between two images that are captured stereoscopically by using two image capturing cameras, or a method for detecting a distance by capturing an image with blurring and color misregistration caused in accordance with the distance by using a single image capturing camera and performing image processing on the blurring and color misregistration.

Examples of Aerial Image Forming Apparatus

The principles of formation of the aerial image 10 are described with reference to FIG. 2A to FIG. 6. All the principles described below are known principles.

Figure 2A:
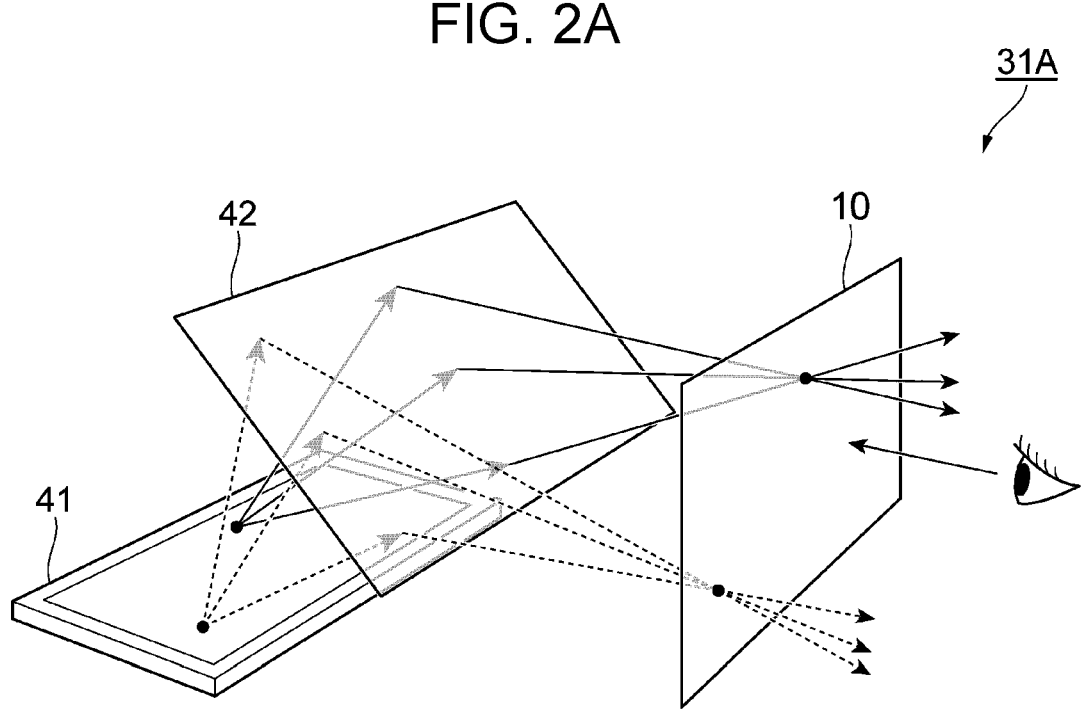
Figure 2B:
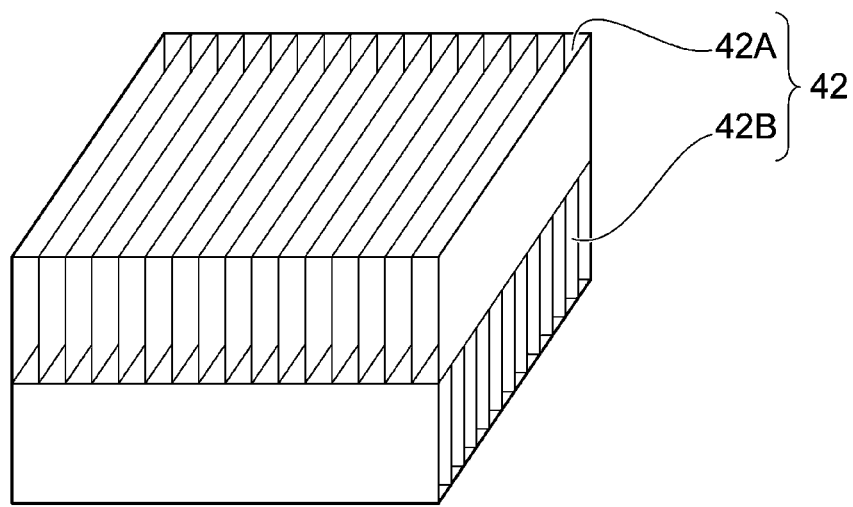

FIGS. 2A and 2B illustrate the principle of an aerial image forming apparatus 31A that forms the aerial image 10 by causing light beams output from a display device 41 to pass through a dedicated optical plate 42. FIG. 2A illustrates a positional relationship between each member and the aerial image 10. FIG. 2B illustrates a part of the sectional structure of the optical plate 42. The display device 41 and the optical plate 42 are examples of an optical component.

The optical plate 42 has a structure in which a plate having strips of glass 42A arrayed so that their wall surfaces are used as mirrors and a plate having strips of glass 42B arrayed in a direction orthogonal to the strips of glass 42A are stacked vertically.

The optical plate 42 reflects the light beams output from the display device 41 twice on the strips of glass 42A and 42B to form an image in the air. Thus, an image displayed on the display device 41 is reproduced in the air. The distance between the display device 41 and the optical plate 42 is equal to the distance between the optical plate 42 and the aerial image 10. The dimensions of the image displayed on the display device 41 are equal to the dimensions of the aerial image 10.

Figure 3:
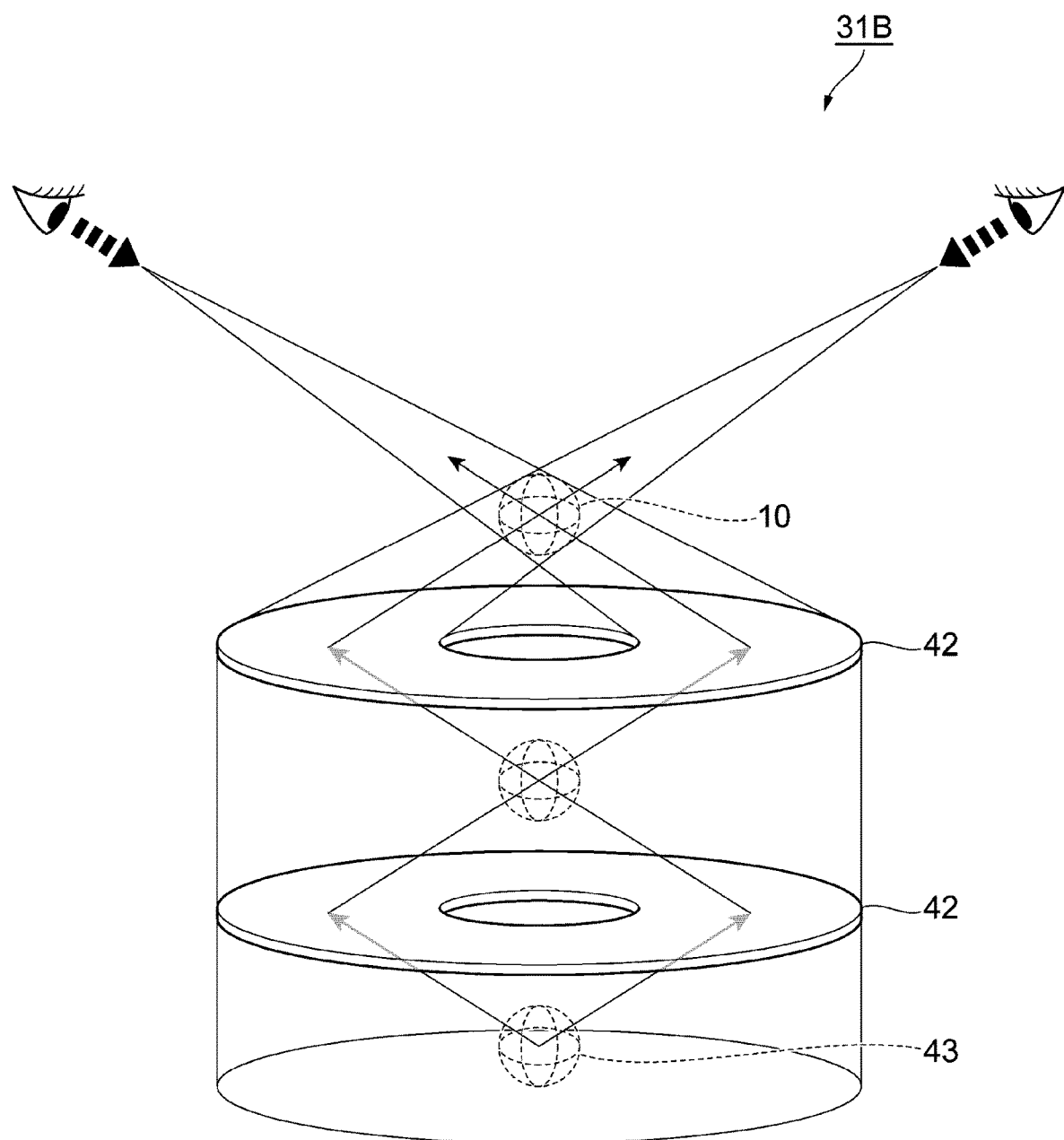
FIG. 3 illustrates the principle of an aerial image forming apparatus that forms a three-dimensional image as the aerial image.

FIG. 3 illustrates the principle of an aerial image forming apparatus 31B that forms a three-dimensional image as the aerial image 10. The aerial image forming apparatus 31B reproduces the three-dimensional image (aerial image 10) in the air by causing light beams reflected on the surface of a real object 43 to pass through ring-shaped optical plates 42 twice. The optical plates 42 need not be arranged in series.

Figure 4A:
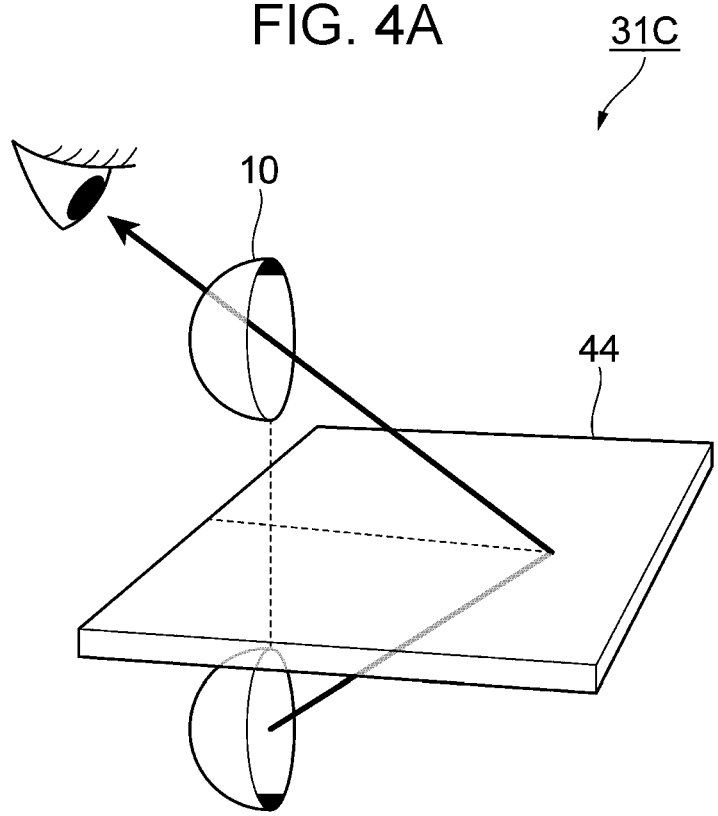
Figure 4B:
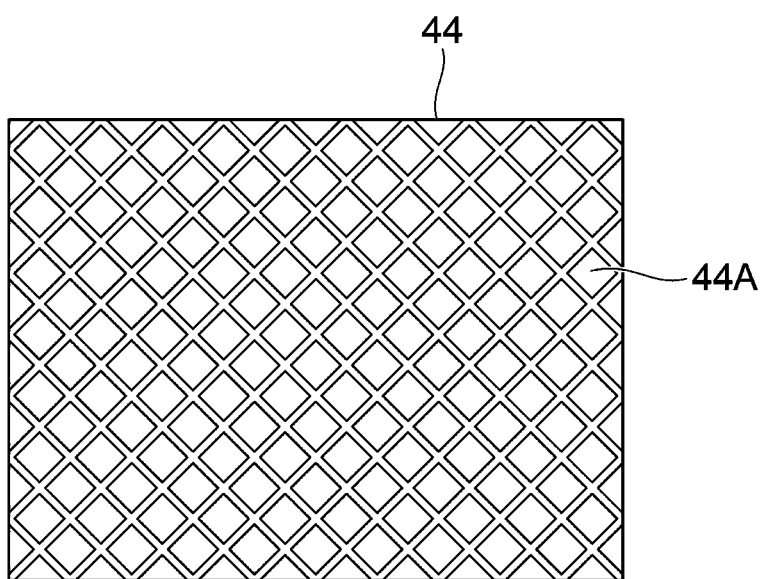

FIGS. 4A and 4B illustrate the principle of an aerial image forming apparatus 31C that forms the aerial image 10 by using a micromirror array 44 having a structure in which minute rectangular holes 44A that constitute a dihedral corner reflector are arrayed in a plane at regular intervals. FIG. 4A illustrates a positional relationship between each member and the aerial image 10. FIG. 4B an enlarged view of a part of the micromirror array 44. For example, each hole 44A is formed at 100 μm square. The micromirror array 44 is an example of the optical component.

Figure 5:
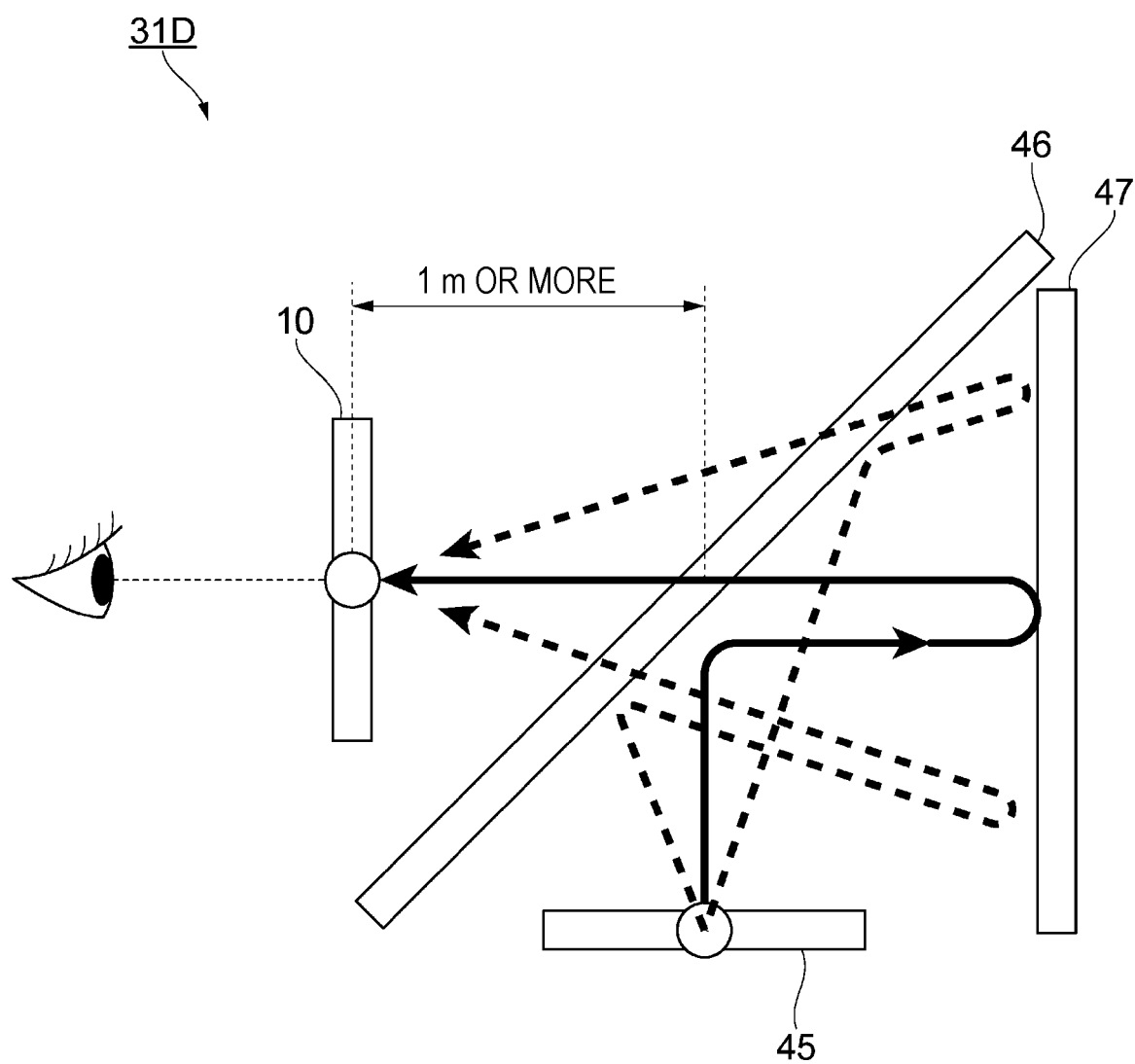
FIG. 5 illustrates the principle of an aerial image forming apparatus that uses a beam splitter and a retroreflective sheet.

FIG. 5 illustrates the principle of an aerial image forming apparatus 31D that uses a beam splitter 46 and a retroreflective sheet 47. The beam splitter 46 is arranged at an angle of 45° with respect to the display surface of a display device 45. The retroreflective sheet 47 is arranged at an angle of 90° with respect to the display surface ref the display device 45 in a direction in which a display image is reflected by the beam splitter 46. The display device 45, the beam splitter 46, and the retroreflective sheet 47 are examples of the optical component.

In the case of the aerial image forming apparatus 31D, light beams output from the display device 45 are reflected by the beam splitter 46 in a direction to the retroreflective sheet 47 and then retroreflected by the retroreflective sheet 47. The light beams pass through the beam splitter 46 to form an image in the air. The aerial image 10 is formed at a position where the image is formed by the light beams.

Figure 6:
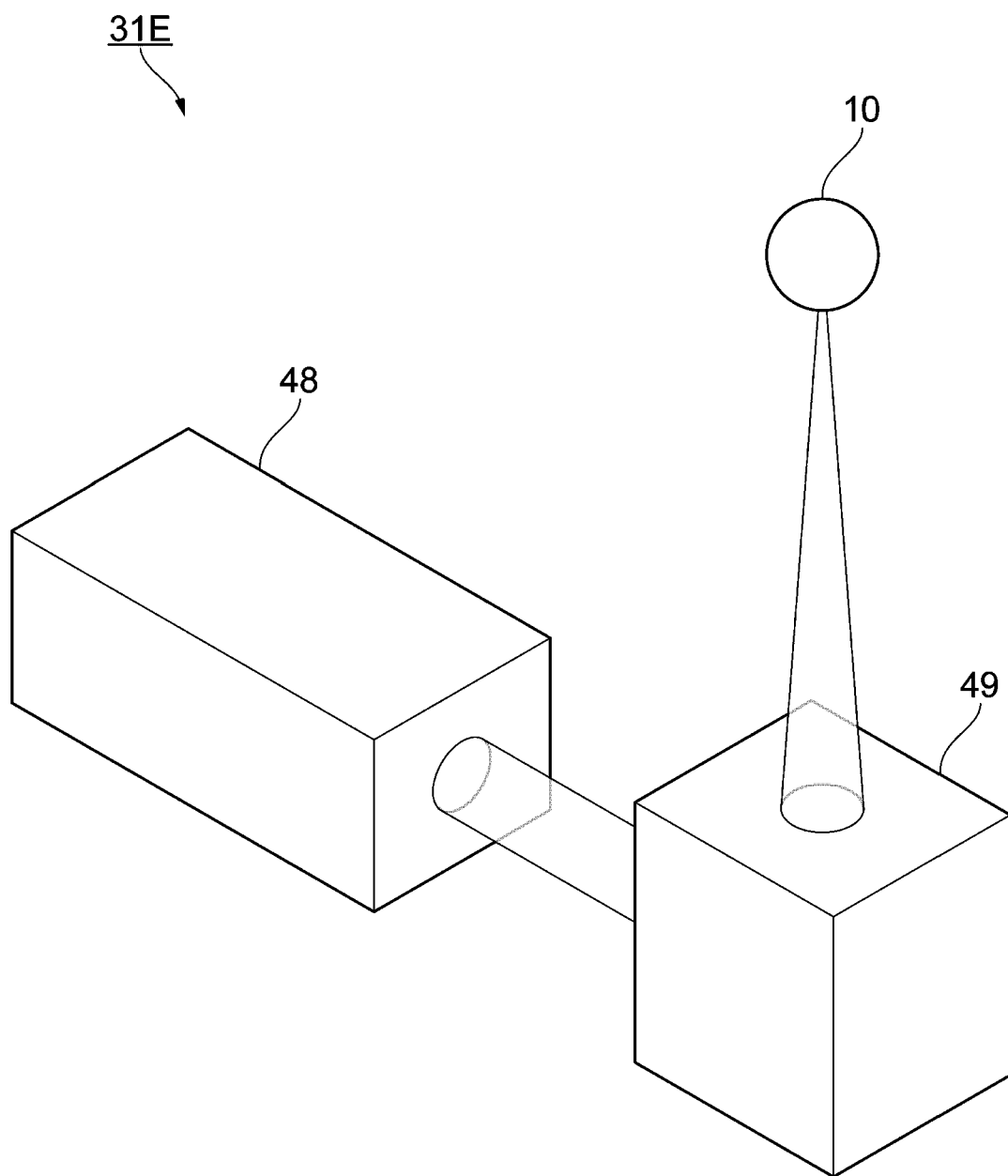
FIG. 6 illustrates the principle of an aerial image forming apparatus that forms the aerial image as an aggregate of plasma luminous bodies.

FIG. 6 illustrates the principle of an aerial image forming apparatus 31E that forms the aerial image 10 as an aggregate of plasma luminous bodies.

In the case of the aerial image forming apparatus 31E, an infrared pulse laser 48 outputs a pulsed laser beam and an XYZ scanner 49 condenses the pulsed laser beam in the air. At this time, gas near a focal point is instantaneously turned into plasma to emit light. For example, the pulse frequency is 100 Hz or lower. For example, the pulse emission time is of the order of nanoseconds. The infrared pulse laser 48 and the XYZ scanner 49 are examples of the optical component.

Configuration of Image Control Apparatus 32A

Figure 7:
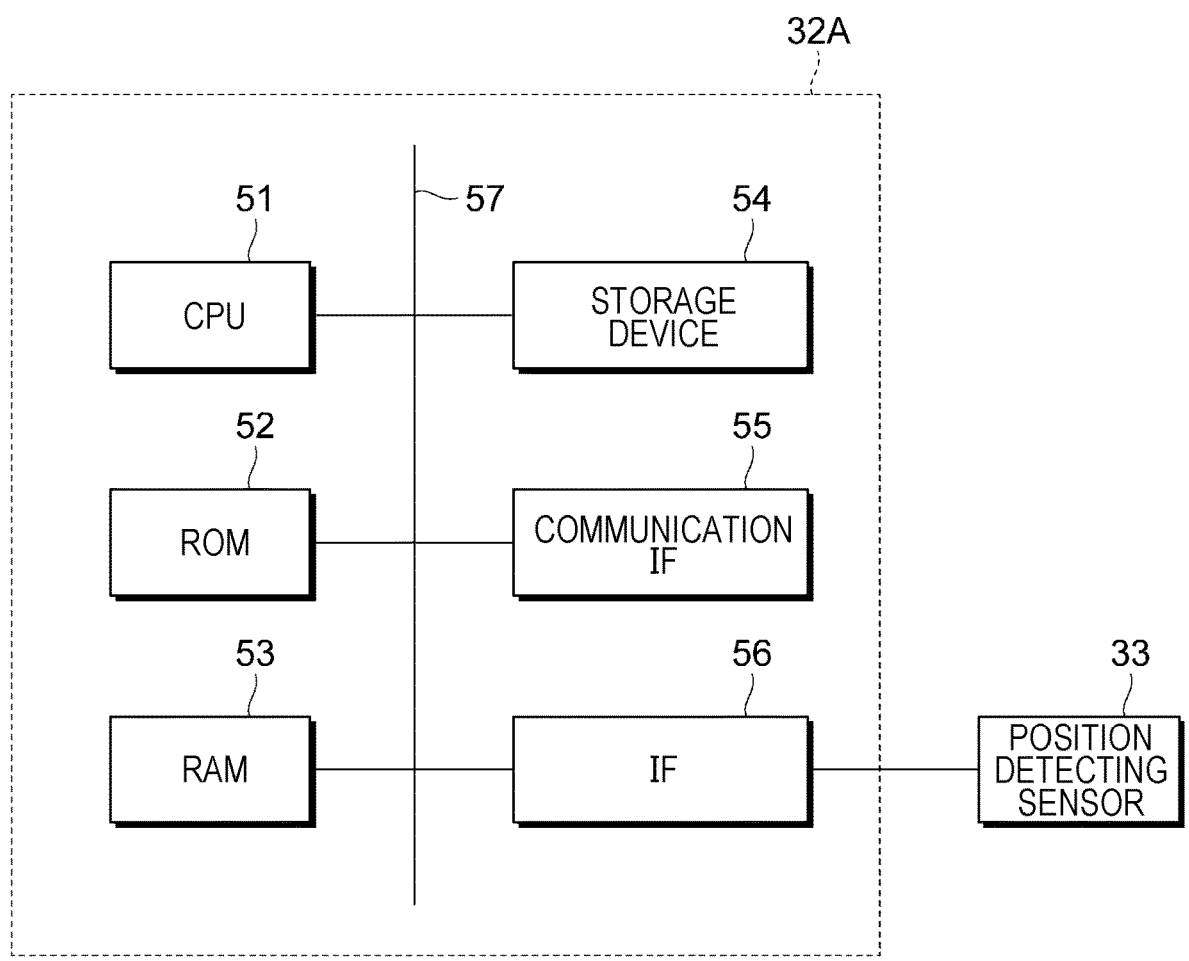
FIG. 7 illustrates an example of the hardware configuration of an image control apparatus according to the first exemplary embodiment.

FIG. 7 illustrates an example of the hardware configuration of the image control apparatus 32A according to the first exemplary embodiment.

The image control apparatus 32A includes a central processing unit (CPU) 51 that provides various functions through execution of firmware and application programs, a read only memory (ROM) 52, which is a storage area that stores the firmware and a basic input output system (BIOS), and a random access memory (RAM) 53, which is an area where the programs are executed. The CPU 51, the ROM 52, and the RAM 53 are examples of a so-called computer.

The image control apparatus 32A includes a storage device 54 that stores data of the application programs and the like. As the storage device 54, for example, a rewritable non-volatile storage medium is used for storing information.

The image control apparatus 32A controls the aerial image forming apparatus 31 by using a communication interface (communication IF) 55 to change the formation of the aerial image 10. The control includes control of the position where the aerial image 10 is formed and the dimensions of the aerial image 10. The position includes not only a two-dimensional position but also a three-dimensional position.

The image control apparatus 32A communicates with the position detecting sensor 33 by using an interface (IF) 56.

The CPU 51 and the respective parts are connected to each other through a bus 57.

Figure 8:
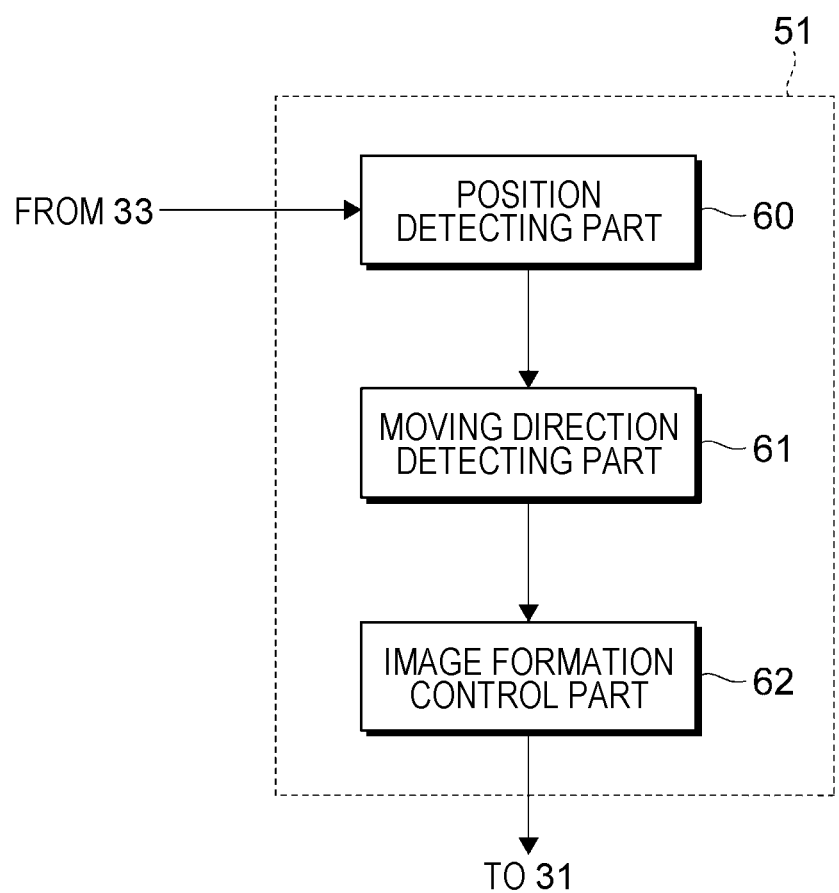
FIG. 8 illustrates an example of the functional configuration of the image control apparatus according to the first exemplary embodiment.

FIG. 8 illustrates an example of the functional configuration of the image control apparatus 32A (see FIG. 7) according to the first exemplary embodiment.

The functional configuration illustrated in FIG. 8 is implemented through execution of a program by the CPU 51 (see FIG. 7).

The CPU 51 functions as a position detecting part 60 that detects the position of the person 20 (see FIG. 1) in a space where the aerial image 10 (see FIG. 1) is formed, a moving direction detecting part 61 that detects a moving direction of the person 20 based on a history of the detected position of the person 20, and an image formation control part 62 that controls the formation of the aerial image 10 based on the detected direction.

The position detecting part 60 detects the position of the person 20 based on information input from the position detecting sensor 33. The position is not limited to coordinates in the space but a predetermined range may be provided as a unit or a direction or distance to the aerial image 10 may be provided. The position of the person 20 is basically a two-dimensional position but may be a three-dimensional position when a height difference is present in a movement path due to stairs, bumps, or the like.

The moving direction detecting part 61 detects a direction of movement relative to the aerial image 10 based on, for example, a history of information on the position detected by the position detecting part 60. When the position detecting sensor 33 is an image capturing camera, the moving direction of the person 20 may be detected by processing image data.

For example, the moving direction of the person 20 includes a direction in which the person 20 approaches the aerial image 10, a direction in which the person 20 passes by the front of the aerial image 10, and a direction in which the person 20 moves away from the aerial image 10.

When the person 20 stands still, a moving direction detected before the person 20 comes to stand still may be used. The moving direction may be a direction predicted through data processing.

The image formation control part 62 has information (three-dimensional) on the space where the aerial image 10 is formed and information (two-dimensional) on the position of the person 20.

The information on the position where the aerial image 10 is formed may be estimated based on a control history accumulated from an initial position, estimated through communication with the aerial image forming apparatus 31, or provided from other sensors.

The image formation control part 62 of this exemplary embodiment performs control so as to move the position where the aerial image 10 is formed based on the position or the moving direction of the person 20. In the case of this exemplary embodiment, examples of the movement to be used herein include a linear movement, a movement by rotation, a combination of linear movements, a combination of movements by rotation, and a combination of a linear movement and a movement by rotation.

Processing Operation of Image Formation Control Part

FIG. 9 is a flowchart for describing an overview of a processing operation to be executed by the image formation control part 62 (see FIG. 8) according to the first exemplary embodiment. Because of the overview, details differ depending on individual styles of use.

First, the image formation control part 62 determines whether a person has been detected (Step 1).

When the result of Step 1 is NO, the image formation control part 62 repeats the determination until a person is detected.

When the result of Step 1 is YES, the image formation control part 62 identifies the position of the person (Step 2). The position of the person may be identified as coordinates in the space, as a position where the position detecting sensor 33 that has detected the person is attached, or as any one of plural ranges that are the units of detection.

Next, the image formation control part 62 identifies a moving direction based on information on the identified position of the person (Step 3).

The identification need not be precise identification.

Then, the image formation control part 62 changes the orientation or the contents of an aerial image based on the identified moving direction (Step 4).

For example, the moving direction and the moving distance of the aerial image are determined based on a relationship between the position where the aerial image is formed and the position of the person or a recommended distance for recognition. When the aerial image is a three-dimensional image, the thickness of the aerial image is also taken into consideration.

Examples of the movement of the aerial image include translation and rotation. In those movements, the dimensions of the aerial image are maintained. The translation is a linear movement to be executed without changing the inclination of a display surface before and after the movement. The rotation is a movement involving rotation about a predetermined imaginary axis.

For example, when the aerial image is formed by the method illustrated in FIGS. 2A and 2B, the display device 41 (see FIG. 2A) and the optical plate 42 (see FIG. 2A) are moved together in one direction by using a movement mechanism (not illustrated). Thus, the aerial image may be translated. Examples of the movement mechanism to be used herein include a single-axis actuator. The display device 41 and the optical plate 42 are moved along a guide mechanism. The moving distance and the position after the movement are detected by a position detecting sensor (not illustrated).

When the aerial image 10 is formed by the method illustrated in FIG. 3 or FIGS. 4A and 4B, the position of the real object may be moved. When the aerial image 10 is formed by the method illustrated in FIG. 5, the position of the display device 45 (see FIG. 5) may be moved parallel to the display surface. When the aerial image 10 is formed by the method illustrated in FIG. 6, the infrared pulse laser 48 (see FIG. 6) and the XYZ scanner 49 (see FIG. 6) may be translated together.

When the aerial image 10 is formed by the method illustrated in FIGS. 2A and 2B, the display device 41 and the optical plate 42 are rotated together by using a rotation mechanism (not illustrated). Thus, the aerial image 10 may be rotated. Examples of the rotation mechanism to be used herein include a motor. The display device 41 (see FIG. 2A) and the optical plate 42 (see FIG. 2A) are rotated together about a rotation axis. The rotation angle and the rotating direction are detected by a position detecting sensor (not illustrated). Depending on the rotating direction of the aerial image 10, the optical plate 42 may be rotated alone.

When the aerial image 10 is formed by the method illustrated in FIG. 3 or FIGS. 4A and 4B, the real object may be rotated. When the aerial image 10 is formed by the method illustrated in FIG. 5, the display device 45 (see FIG. 5) may be rotated. When the aerial image 10 is formed by the method illustrated in FIG. 6, there may be used a method for rotating the infrared pulse laser 48 (see FIG. 6) and the XYZ scanner 49 (see FIG. 6) together. Alternatively, coordinates to be provided to the XYZ scanner 49 may be changes to coordinates after the rotation.

Movement Examples of Aerial Image 10

Movement Example 1

Description is given of a case in which the person 20 approaches the aerial image 10.

Figure 10A:
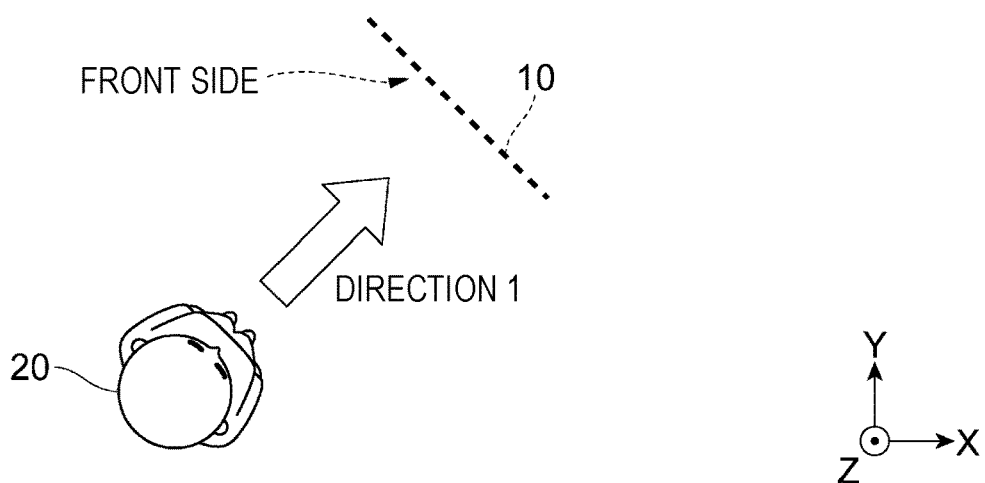
Figure 10B:
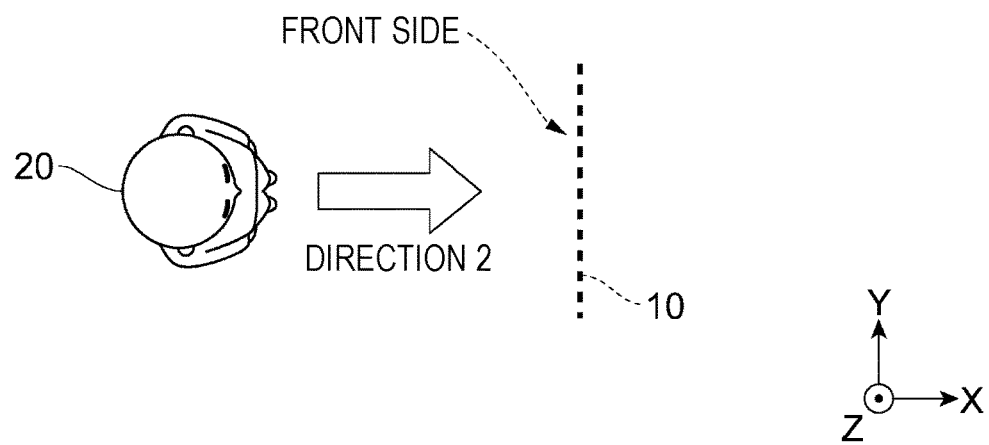
Figure 10C:
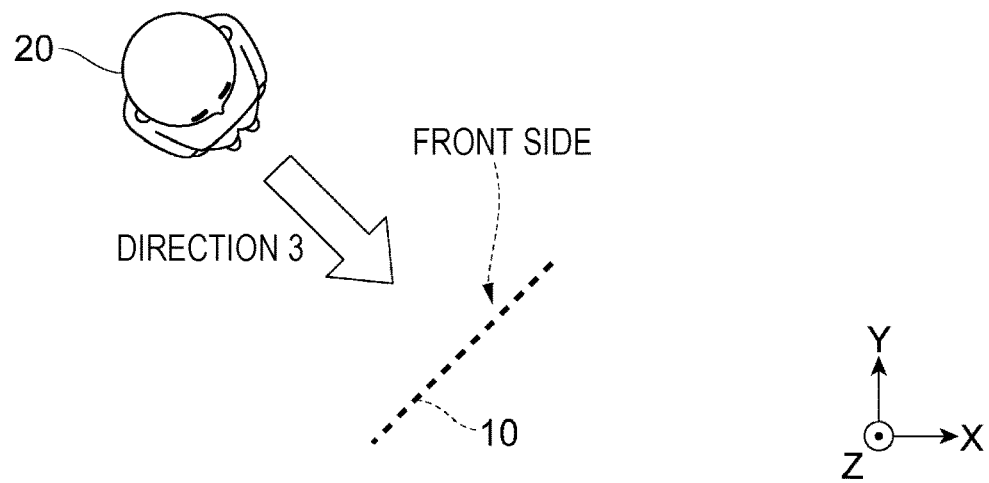

FIGS. 10A to 10C illustrate an example in which the formation of the aerial image 10 is controlled so that the aerial image 10 faces the person 20. FIG. 10A illustrates a position of the aerial image 10 when the person 20 moves in the direction 1. FIG. 10B illustrates a position of the aerial image 10 when the person 20 moves in the direction 2. FIG. 10C illustrates a position of the aerial image 10 when the person 20 moves in the direction 3.

The direction 1 is a direction that is defined counterclockwise at 45° with respect to the direction 2. The direction 3 is a direction that is defined clockwise at 45° with respect to the direction 2.

Even if the person 20 moves in any direction, the aerial image 10 is formed so as to face the person 20. Therefore, the visibility of the aerial image 10 for the person 20 increases compared with the case in which the position of the aerial ire age 10 is fixed. In other words, the decrease in the visibility is avoided.

Figure 11A:
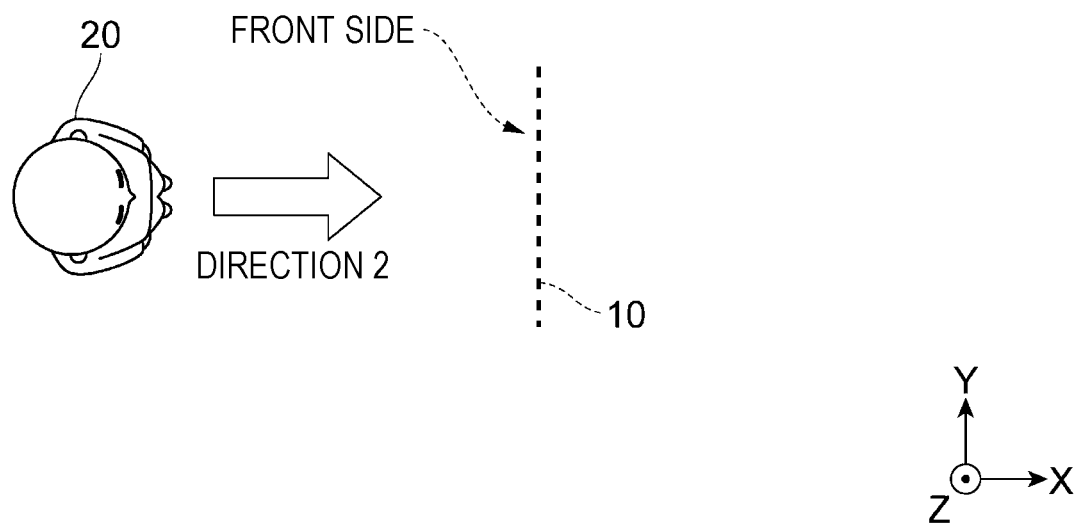
Figure 11B:
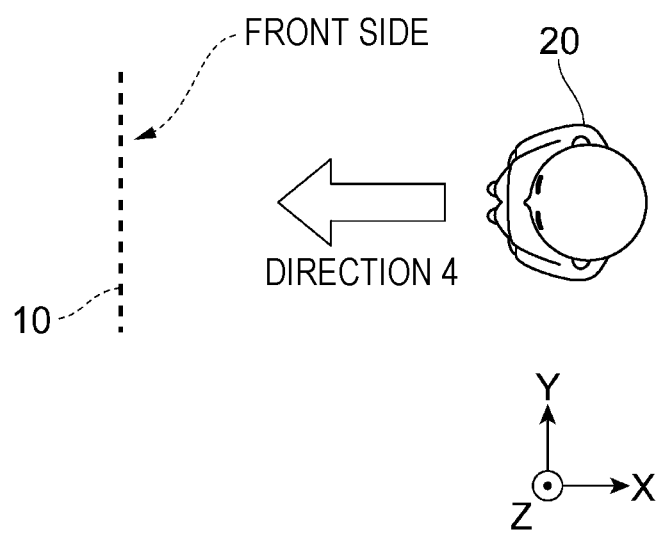

FIGS. 11A and 11B illustrate another example in which the formation of the aerial image 10 is controlled so that the aerial image 10 faces the person 20. FIG. 11A illustrates a position of the aerial image 10 when the person 20 moves in the direction 2. FIG. 11B illustrates a position of the aerial image 10 when the person 20 moves in a direction 4.

The direction 4 is opposite the direction 2. Therefore, when the person 20 approaches the aerial image 10 in the direction 4, the front side is switched from that in the case in which the person 20 approaches the aerial image 10 in the direction 2. Thus, the person 20 may recognize the aerial image 10 in a proper orientation irrespective of the direction in which the person 20 approaches the aerial image 10.

Movement Example 2

Description is given of a case in which the person 20 passes by the front of the aerial image 10.

Figure 12A:
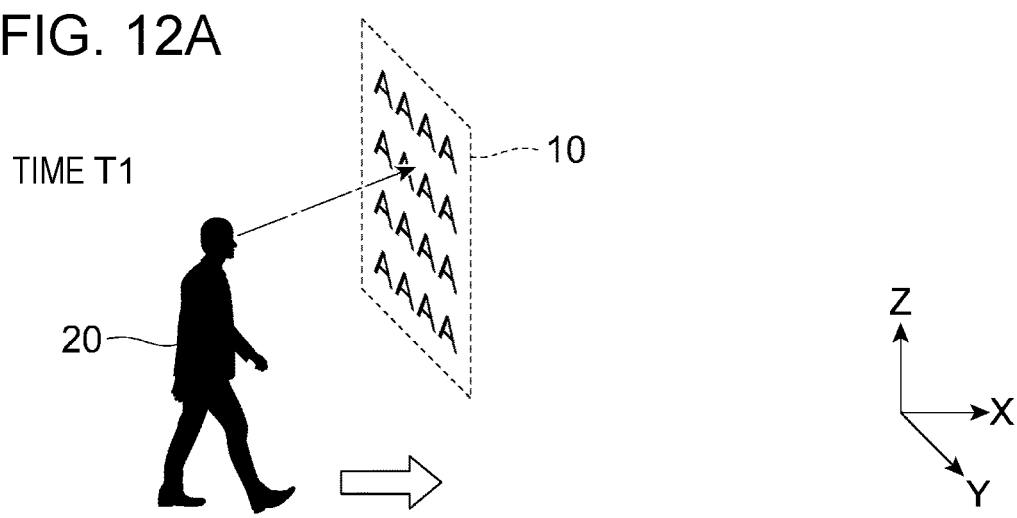
Figure 12B:
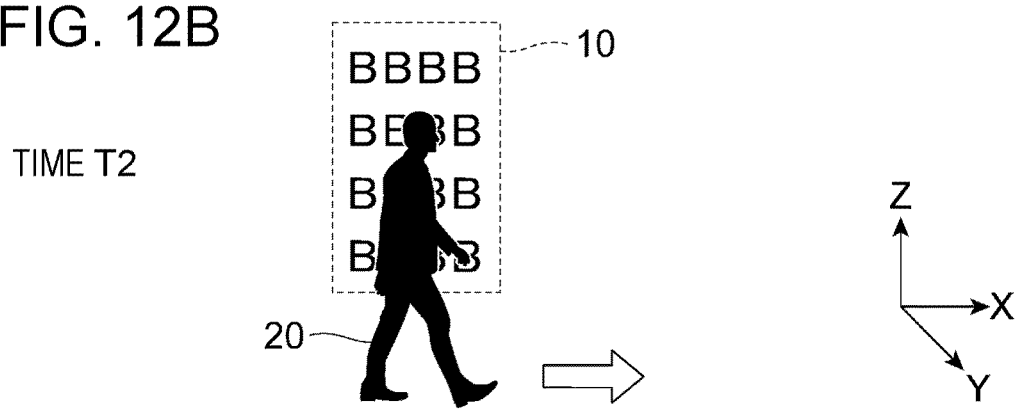
Figure 12C:
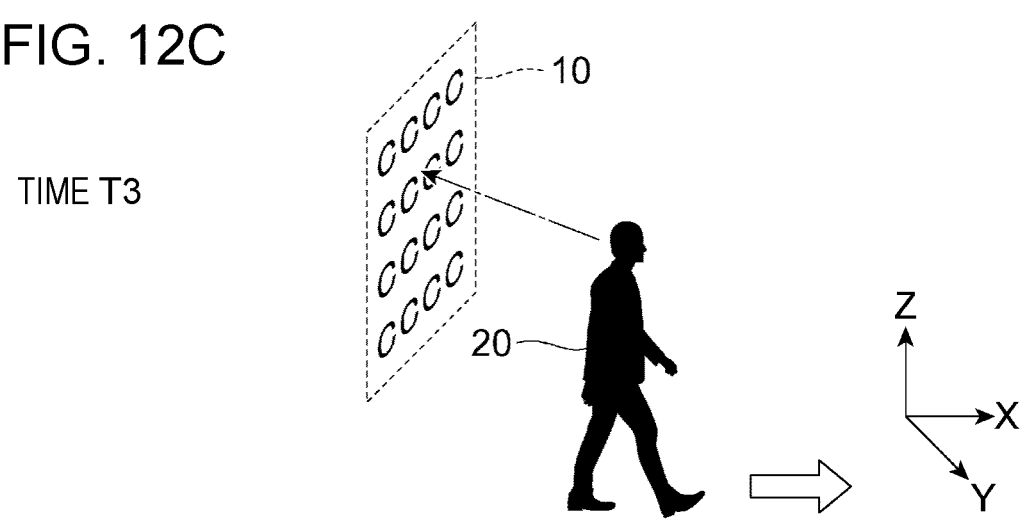

FIGS. 12A to 12C illustrate an example in which the aerial image 10 is formed when the person 20 moves in one direction through an area located away from the aerial image 10. FIG. 12A illustrates a relationship between the aerial image 10 and the position of the person 20 at a time T1. FIG. 12B illustrates a relationship between the aerial image 10 and the position of the person 20 at a time T2, FIG. 12C illustrates a relationship between the aerial image 10 and the position of the person 20 at a time T3.

In this movement example, the orientation of the front side of the aerial image 10 (direction of the normal) is caused to follow the movement of the person 20, thereby increasing the visibility of the aerial image 10 for the person 20. Specifically, the orientation of the front side of the aerial image 10 is rotated about an imaginary rotation axis.

In this exemplary embodiment, a line passing through the midpoints of the upper and lower sides that are short sides of the aerial image 10 is defined as the rotation axis. That is, the aerial image 10 is rotated in an XY plane.

Therefore, the aerial image 10 is recognized in a state in which the aerial image 10 faces the person 20 at the position of the person 20 at the time T1, the position of the person 20 at the time T2, and the position of the person 20 at the time T3. Thus, the person 20 recognizes the aerial image 10 easily during the movement.

During the rotation about the rotation axis, the contents of the aerial image 10 may be changed but may be left unchanged. In the example of FIGS. 12A to 12C, the display contents are changed in accordance with the movement of the person 20.

For example, an aerial image 10 that reads "AAAA/AAAA/AAAA/AAAA" ("/" means a line break; the same applies hereinafter) as its contents is recognized at the position of the time T1. An aerial image 10 that reads "BBBB/BBBB/BBBB/BBBB" as its contents is recognized at the position of the time T2. An aerial image 10 that reads "CCCC/CCCC/CCCC/CCCC" as its contents is recognized at the position of the time T3.

The display contents are changed at certain timings. By changing the display contents of the aerial image 10 in accordance with the movement of the person 20, various representations may be achieved.

Second Exemplary Embodiment

Schematic Configuration of Aerial Image Forming System

Figure 13:
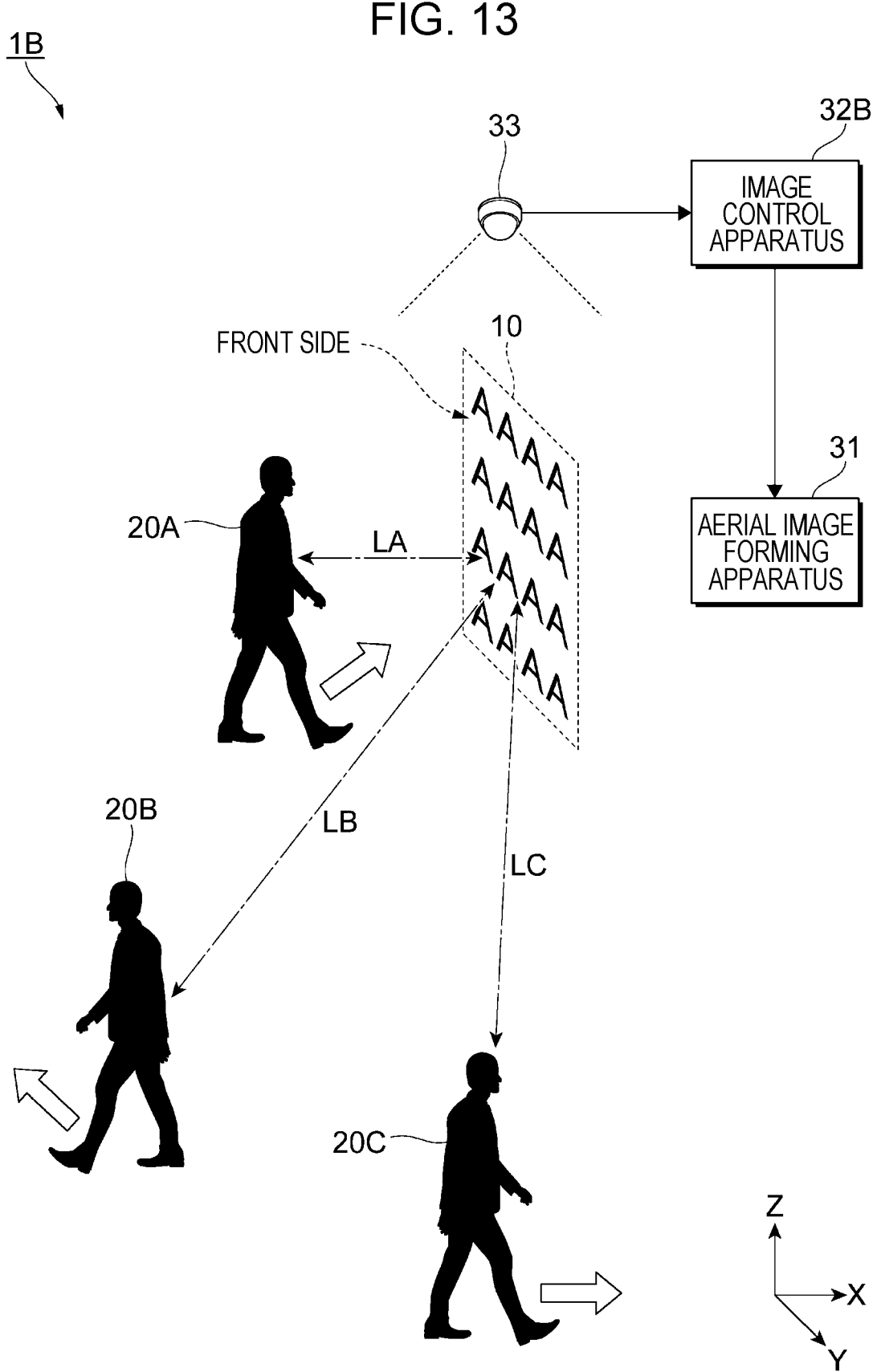
FIG. 13 illustrates the schematic configuration of an aerial image forming system according to a second exemplary embodiment.

FIG. 13 illustrates the schematic configuration an aerial image forming system 1B according to a second exemplary embodiment. The aerial image forming system 1B is an example of the information processing system.

In FIG. 13, parts corresponding to those in FIG. 1 are denoted by the same reference symbols.

In this exemplary embodiment, description is given of an operation of an image control apparatus 32B when plural persons 20A to 20C are located around the aerial image 10. The persons 20A to 20C illustrated in FIG. 13 are moving in different directions.

The aerial image forming system 1B of this exemplary embodiment includes the aerial image forming apparatus 31 that forms the aerial image 10 in the air, the image control apparatus 32B that controls the aerial image forming apparatus 31, and the position detecting sensor 33 that detects the position of the person 20.

In FIG. 13, the person 20A is located closer to the aerial image 10 than any other persons. The distance between the person 20A and the aerial image 10 is represented by LA. The distance between the person 20B and the aerial image 10 is represented by LB. The distance between the person 20C and the aerial image 10 is represented by LC.

The image control apparatus 32B of this exemplary embodiment has the hardware configuration illustrated in FIG. 7. The image control apparatus 32B is an example of the controller and is also an example of the information processing apparatus.

Figure 14:
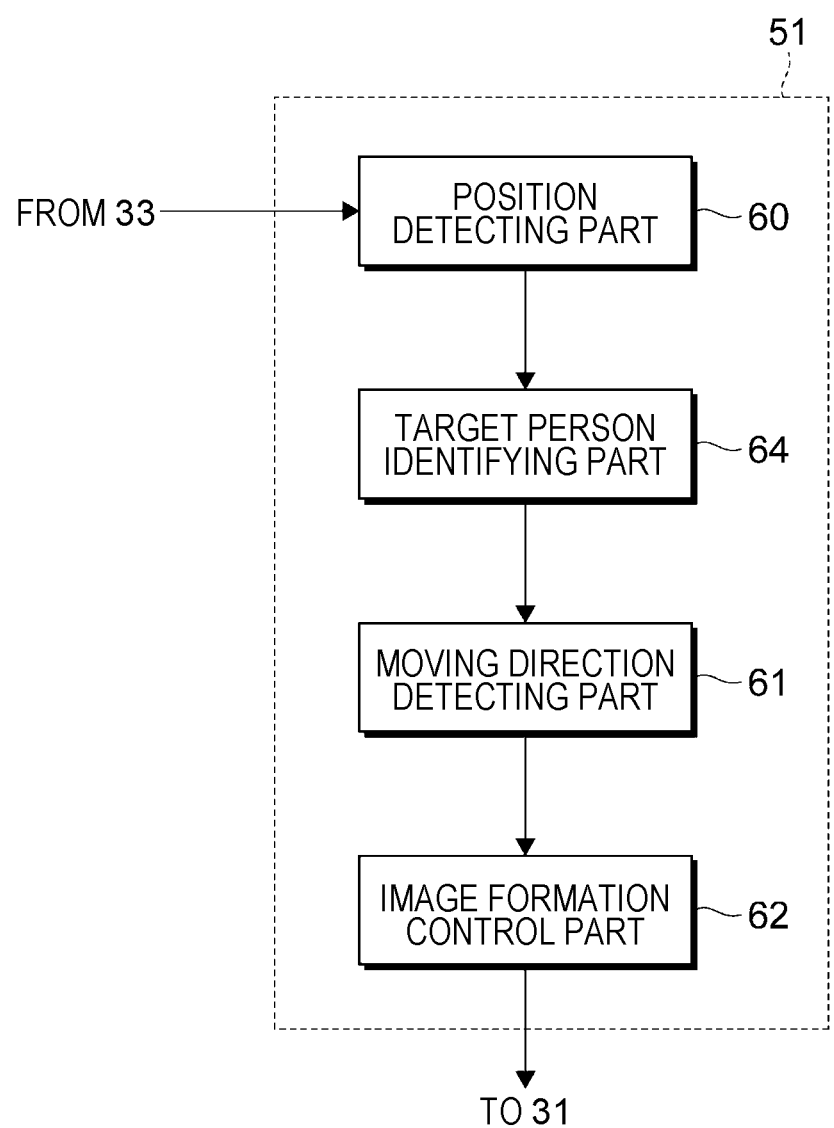
FIG. 14 illustrates an example of the functional configuration of an image control apparatus according to the second exemplary embodiment.

FIG. 14 illustrates an example of the functional configuration of the image control apparatus 32B (see FIG. 13) according to the second exemplary embodiment.

In FIG. 14, parts corresponding to those in FIG. 8 are denoted by the same reference symbols.

The functional configuration illustrated in FIG. 14 is implemented through execution of a program by the CPU 51.

This exemplary embodiment is different from the first exemplary embodiment in that a target person identifying part 64 is arranged between the position detecting part 60 and the moving direction detecting part 61. In other respects, this exemplary embodiment is in common with the first exemplary embodiment.

The target person identifying part 64 executes processing of identifying a target person for detection of the moving direction out of the plural detected persons 20A to 20C. In the case of this exemplary embodiment, the target person identifying part 64 identifies, as the target person, one of the plural detected persons who is closer to the aerial image 10 than any other persons. In the example of FIG. 13, the person 20A is the target person.

When plural target persons are present, the target person identifying part 64 determines one of the plural target persons in accordance with a predetermined rule.

For example, when one of the plural target persons is approaching the aerial image 10 but the others are moving away from the aerial image 10, the target person identifying part 64 selects the target person who is approaching the aerial image 10. This is because a person who approaches the aerial image 10 empirically has a greater interest in the aerial image 10 than a person who moves away from the aerial image 10.

For example, when an image capturing camera may be used, a higher priority is given to a person who turns his or her face to the aerial image 10 out of the target persons. This is because the aerial image 10 is controlled for the purpose of increasing the visibility and therefore the aerial image 10 need not be oriented to a person who does not look at the aerial image 10.

Even if a person closer to the aerial image 10 is detected, the target person need not be switched promptly. This is because the visibility for a person who looking at the aerial image 10 may decrease when the target person is switched, for example, before the displaying of advertisement or guidance of a predetermined length of time (for example, 15 seconds) is terminated.

The target person identifying part 64 may be arranged between the moving direction detecting part 61 and the image formation control part 62. In this case, the target person identifying part 64 identifies the target person based on information on the detected positions and the detected moving directions of plural persons.

Figure 15:
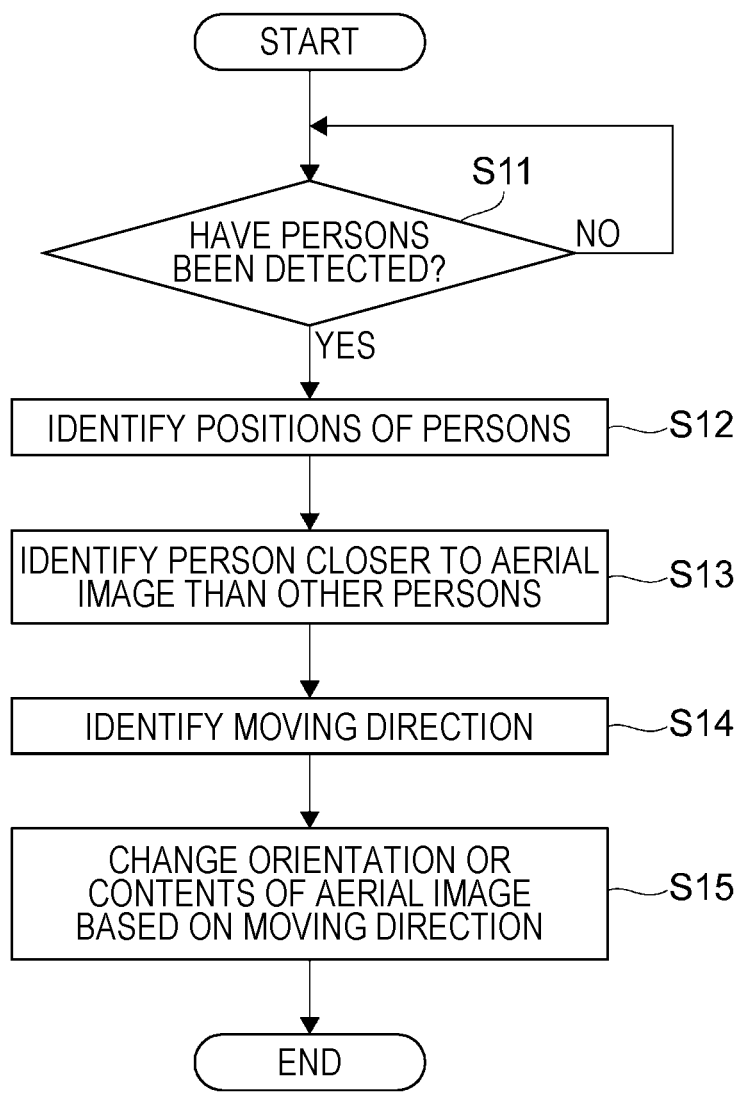
FIG. 15 is a flowchart for describing an overview of a processing operation to be executed by an image formation control part according to the second exemplary embodiment.

FIG. 15 is flowchart for describing an overview of a processing operation to be executed by the image formation control part 62 (see FIG. 14) according to the second exemplary embodiment. Because of the overview, details differ depending on individual styles of use.

First, the image formation control part 62 determines whether persons have been detected (Step 11).

When the result of Step 11 is NO, the image formation control part 62 repeats the determination until persons are detected.

When the result of Step 11 is YES, the image formation control part 62 identifies the positions of the persons (Step 12).

Next, the image formation control part 62 identifies a person closer to an aerial image than any other persons (Step 13). When the number of detected persons is one, this processing is not necessary.

Then, the image formation control part 62 identifies a moving direction based on information on the identified position of the person (Step 14).

Then, the tag formation control part 62 changes the orientation or the contents of the aerial image based on the identified moving direction (Step 15).

Figure 16:
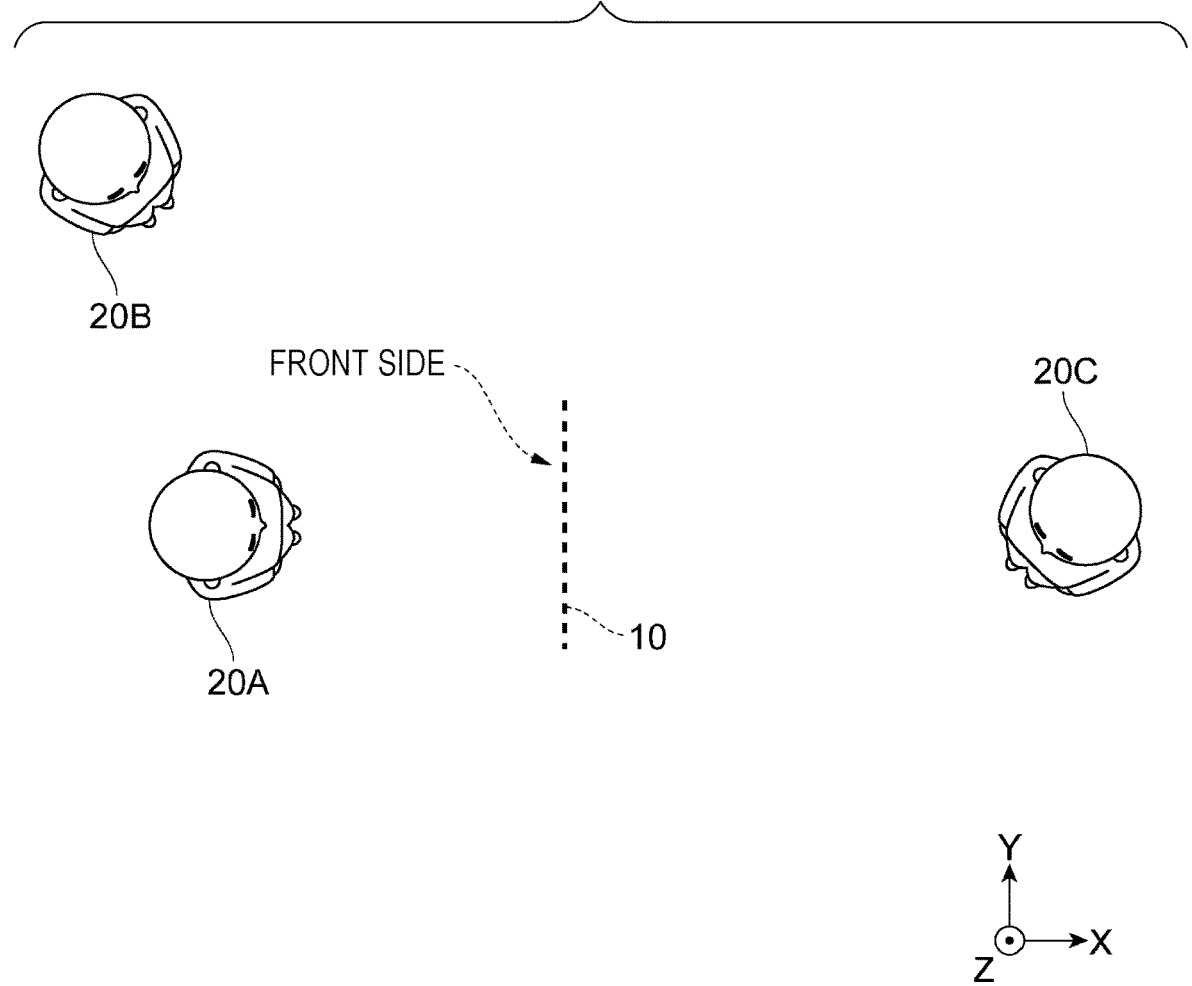
FIG. 16 illustrates a method for forming an aerial image in the second exemplary embodiment.

FIG. 16 illustrates a method for forming the aerial image 10 in the second exemplary embodiment.

FIG. 16 is a top view of the space where the aerial image 10 is formed. In the example of FIG. 16, the three persons 20A to 20C are present around the aerial image 10. Of the three persons, the person 20A is closer to the aerial image 10 than the other two persons. Therefore, the aerial image 10 is formed so as to face the person 20A.

Third Exemplary Embodiment

Schematic Configuration of Aerial Image Forming System

Figure 17:
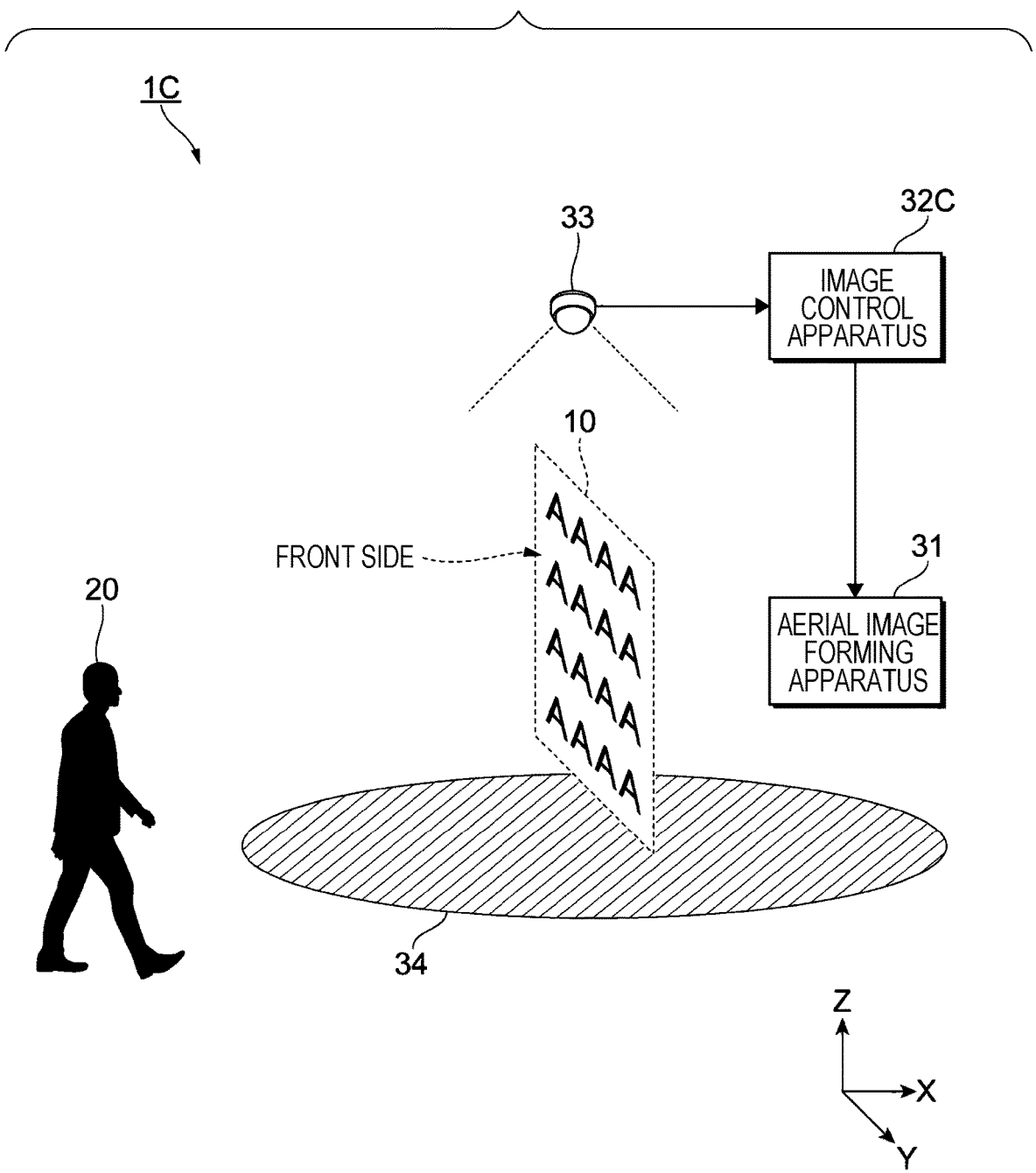
FIG. 17 illustrates the schematic configuration of an aerial image forming system according to a third exemplary embodiment.

FIG. 17 illustrates the schematic configuration of an aerial image forming system 1C according to a third exemplary embodiment. The aerial image forming system 1C is an example of the information processing system.

In FIG. 17, parts corresponding to those in FIG. 1 are denoted by the same reference symbols.

In this exemplary embodiment, description is given of a case in which the control for the orientation or the contents of the aerial image 10 is changed based on whether the detected person 20 is located within or out of a range 34 set around the aerial image 10.

In the case of FIG. 17, the range 34 has a circular shape. In the case of FIG. 17, the center of the circle substantially coincides with the center of the aerial image 10. The center of the aerial image 10 is defined as a point bisecting the short side of the planar aerial image 10. The shape of the range 34 may be an elliptical shape, a rectangular shape, a polygonal shape, or other shapes.

In the case of FIG. 17, the center of the circle that defines the range 34 substantially coincides with the center of the aerial image 10 and therefore the range 34 extends equally in any directions from the center. The range may be wide in a specific direction and narrow in the other directions. For example, when there is a desire to increase the visibility from a distant position for a person 20 who approaches the aerial image 10 in a specific direction than for persons 20 who approach the aerial image 10 in the other directions, the range 34 is set wider for the direction concerned.

The aerial image forming system IC of this exemplary embodiment includes the aerial image forming apparatus 31 that forms the aerial image 10 in the air, an image control apparatus 32C that controls the aerial image forming apparatus 31, and the position detecting sensor 33 that detects the position of the person 20.

Information on the range 34 set in advance is stored in the image control apparatus 32C of this exemplary embodiment.

The image control apparatus 32C of this exemplary embodiment also has the hardware configuration illustrated in FIG. 7. The image control apparatus 32C is an example of the controller and is also an example of the information processing apparatus.

Figure 18:
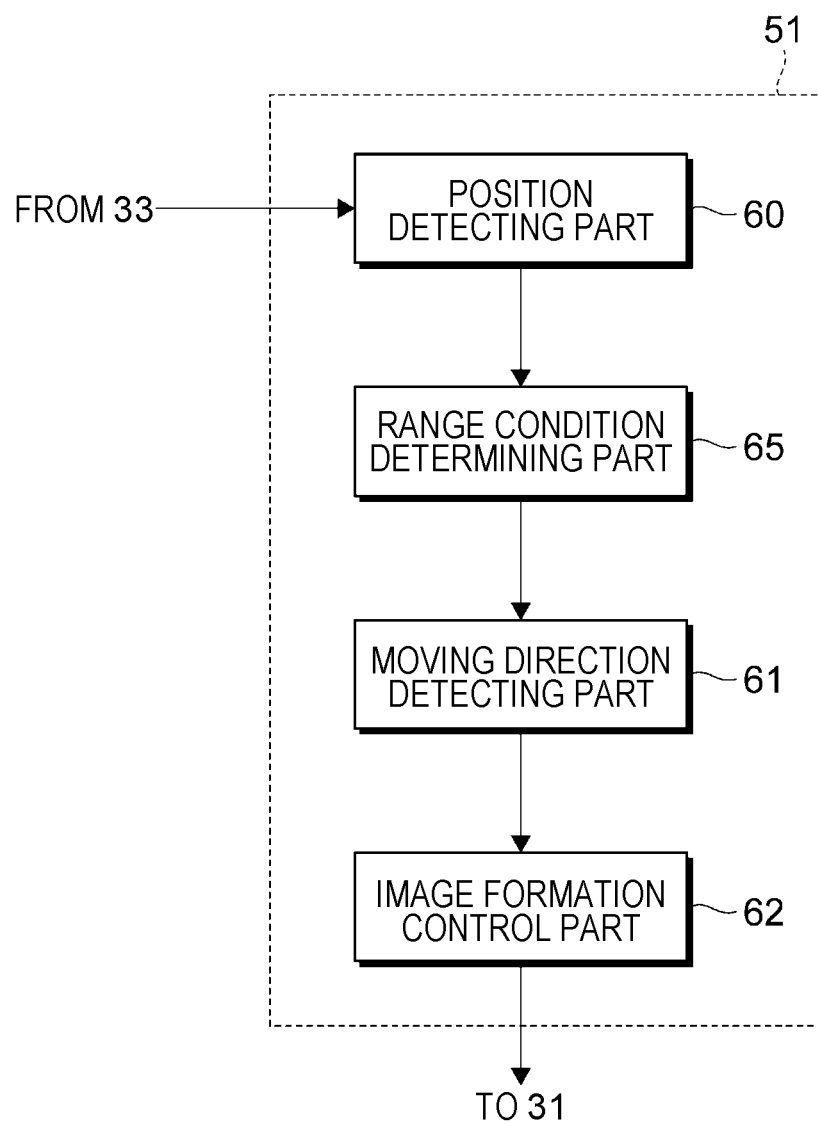
FIG. 18 illustrates an example of the functional configuration of an image control apparatus according to the third exemplary embodiment.

FIG. 18 illustrates an example of the functional configuration of the image control apparatus 32C (see FIG. 17) according to the third exemplary embodiment.

In FIG. 18, parts corresponding to those in FIG. 8 are denoted by the same reference symbols.

The functional configuration illustrated in FIG. 18 is implemented through execution of a program by the CPU 51.

This exemplary embodiment is different from the first exemplary embodiment in that a range condition determining part 65 is arranged between the position detecting part 60 and the moving direction detecting part 61. In other respects, this exemplary embodiment is in common with the first exemplary embodiment.

The range condition determining part 65 executes processing of determining whether the detected position of the person falls within the range 34 set in advance (see FIG. 17). In the case of this exemplary embodiment, when the detected position of the person falls out of the range 34, the processing operations of the moving direction detecting part 61 and the image formation control part 62 are not executed.

The range condition determining part 65 may be arranged between the moving direction detecting part 61 and the image formation control part 62.

Figure 19:
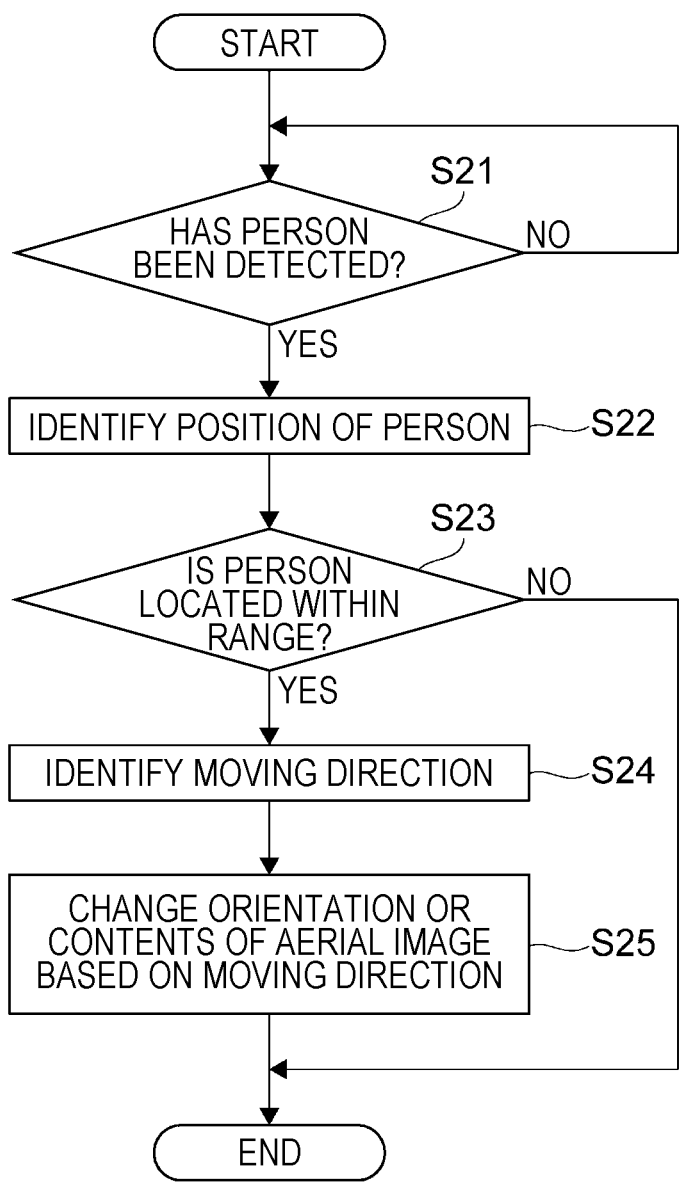
FIG. 19 is a flowchart for describing an overview of a processing operation to be executed by an image formation control part.

FIG. 19 is a flowchart for describing an overview of a processing operation to be executed by the image formation control part 62 (see FIG. 18). Because of the overview, details differ depending on individual styles of use.

First, the image formation control part 62 determines whether a person has been detected (Step 21).

When the result of Step 21 is NO, the image formation control part 62 repeats the determination until a person is detected.

When the result of Step 21 is YES, the image formation control part 62 identifies the position of the person (Step 22).

Next, the image formation control part 62 determines whether the identified position of the person falls within the range 34 (see FIG. 17) (Step 23).

When the result of Step 23 is NO, the image formation control part 62 terminates the series of processing operations without executing subsequent processing operations.

When the result of Step 23 is YES, the image formation control part 62 identifies a moving direction based on information on the identified position of the person (Step 24).

Then, the image formation control part 62 changes the orientation or the contents of an aerial image based on the identified moving direction (Step 25).

Figure 20:
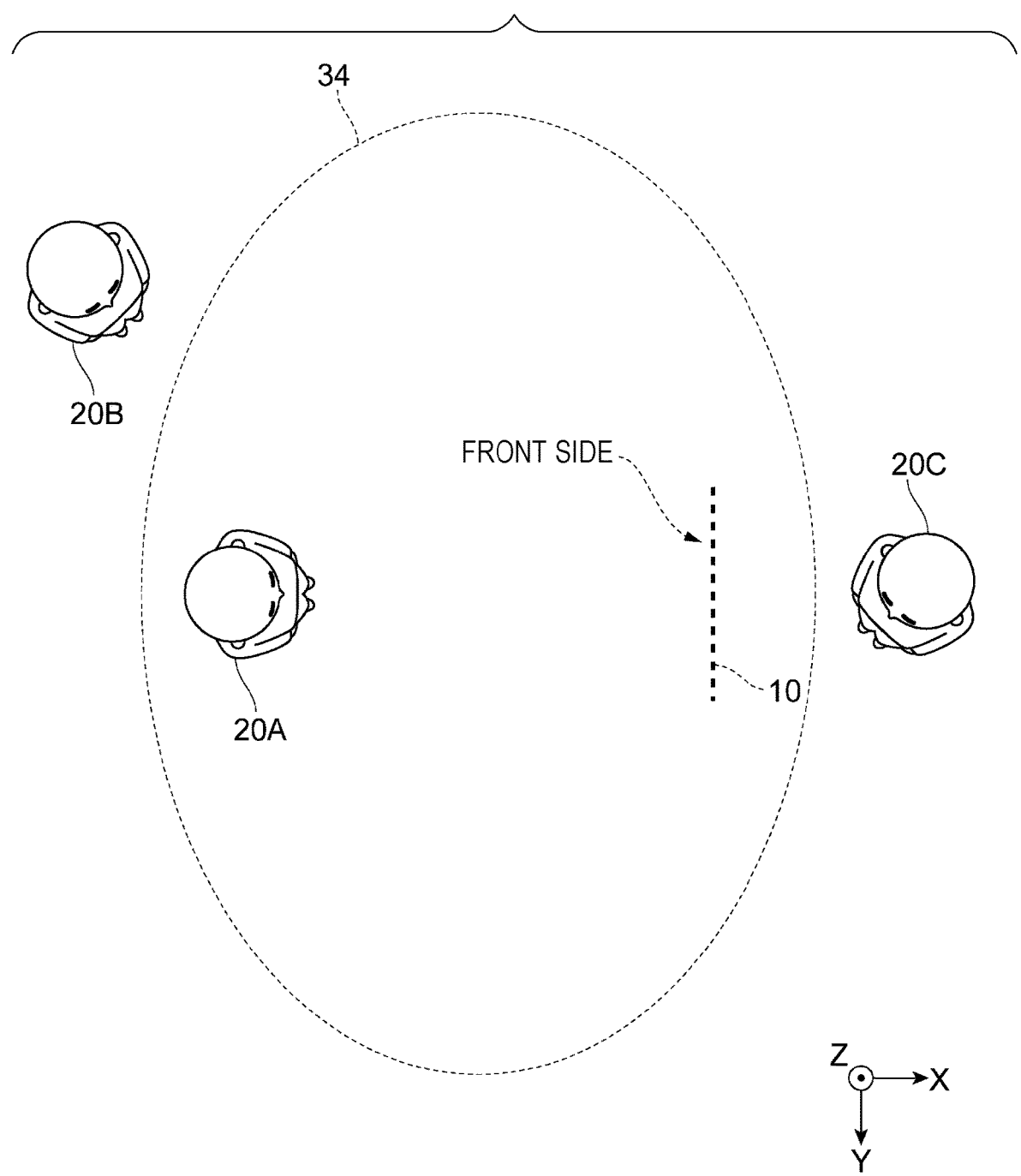
FIG. 20 illustrates a method for forming an aerial image in the third exemplary embodiment.

FIG. 20 illustrates a method for forming the aerial image 10 in the third exemplary embodiment.

FIG. 20 is a top view of the space where the aerial image 10 is formed. In the example of FIG. 20, three persons 20A to 20C are present around the aerial image 10. Of the three persons, the person 20A is located within the range 34 and the person 20B and the person 20C are located out of the range 34.

In the case of this example, the range 34 has an elliptical shape and is wide in the direction to the person 20A and narrow in the direction to the person 20C with respect to the display surface of the aerial image 10. Therefore, the aerial image 10 is formed so as to face the person 20A even though the person 20C is closer to the aerial image 10.

Fourth Exemplary Embodiment

Schematic Configuration of Aerial Image Forming System

Figure 21:
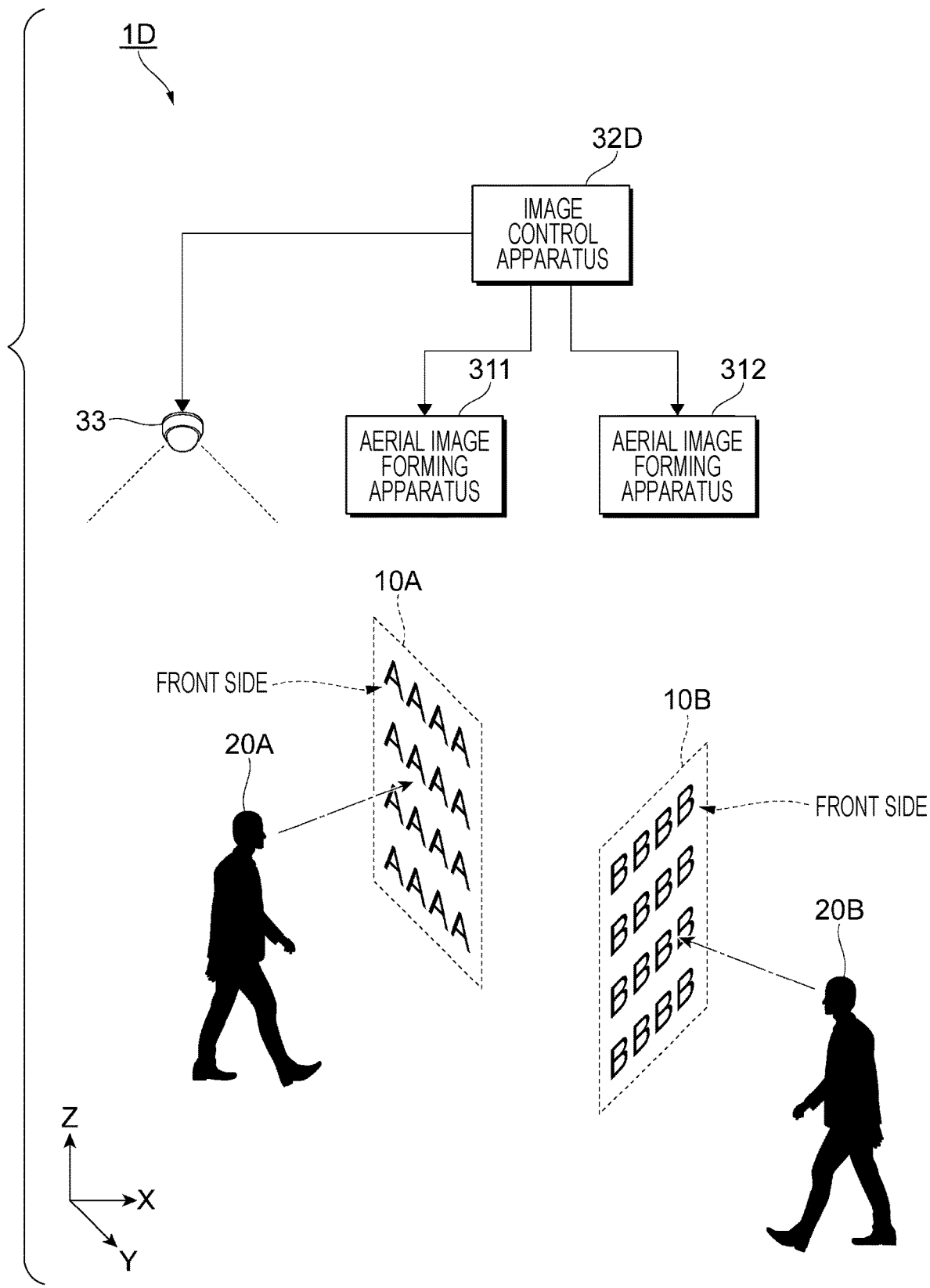
FIG. 21 illustrates the schematic configuration of an aerial image forming system according to a fourth exemplary embodiment.

FIG. 21 illustrates the schematic configuration of an aerial image forming system in according to a fourth exemplary embodiment. The aerial image forming system 1D is an example of the information processing system.

In FIG. 21, parts corresponding to those in FIG. 1 are denoted by the same reference symbols.

In this exemplary embodiment, description is given of a case in which two aerial images 10A and 10B are formed by using two aerial image forming apparatuses 311 and 312.

In FIG. 21, it is assumed that two persons 20A and 20B approach the aerial images 10A and 10B in different directions, respectively.

The aerial image forming system 1D of this exemplary embodiment includes the aerial image forming apparatus 311 that forms the aerial image 10A in the air, the aerial image forming apparatus 312 that forms the aerial image 10B in the air, an image control apparatus 32D that controls the aerial image forming apparatuses 311 and 312, and the position detecting sensor 33 that detects the positions of the persons 20A and 20B.

The image control apparatus 32D of this exemplary embodiment also has the hardware configuration illustrated in FIG. 7. The image control apparatus 32D is an example of the controller and is also an example of the information processing apparatus.

Figure 22:
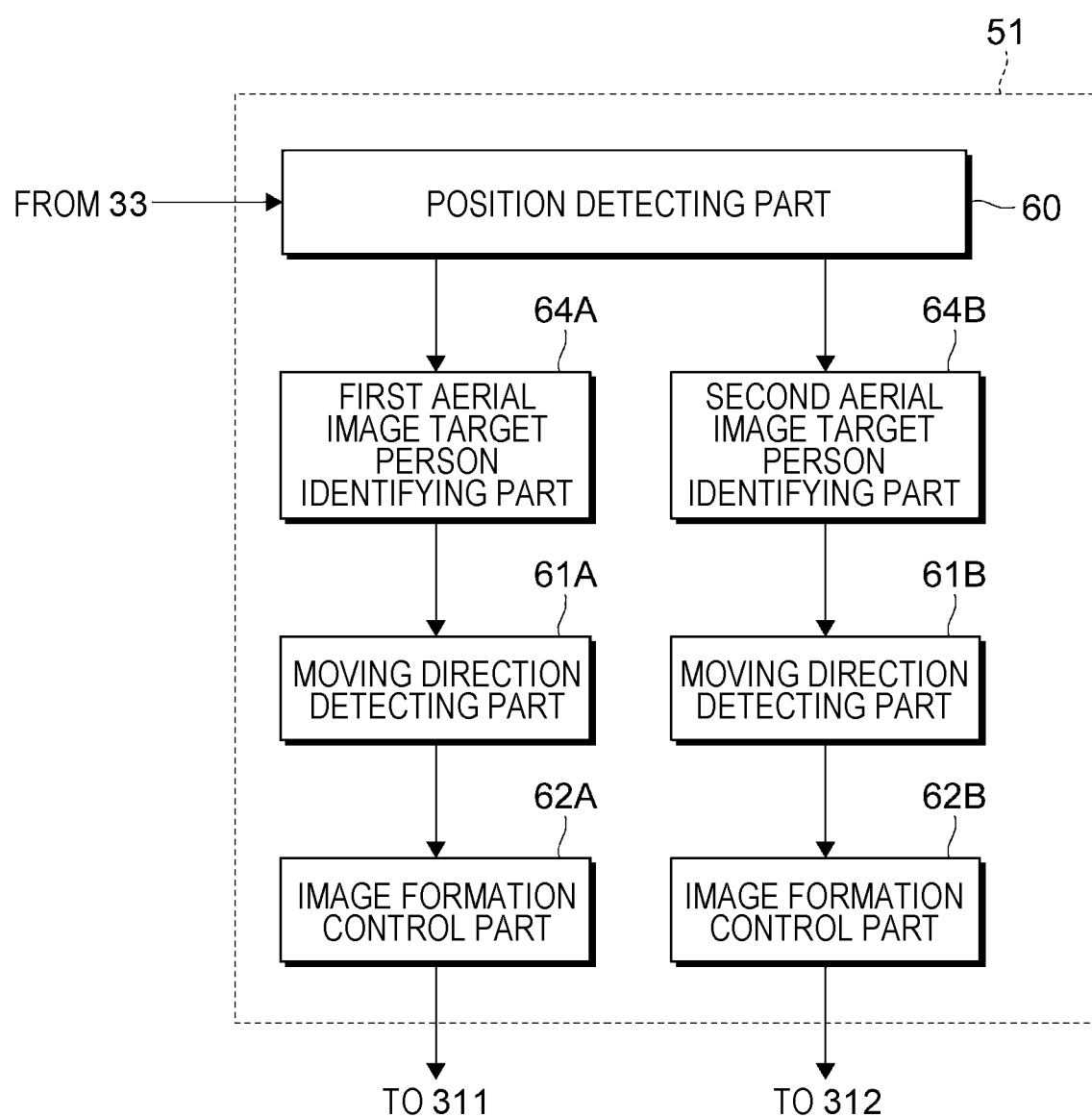
FIG. 22 illustrates an example of the functional configuration of an image control apparatus according to the fourth exemplary embodiment.

FIG. 22 illustrates an example of the functional configuration of the image control apparatus 32D (see FIG. 21) according to the fourth exemplary embodiment.

In FIG. 22, parts corresponding to those in FIG. 14 are denoted by the same reference symbols.

The functional configuration illustrated in FIG. 22 implemented through execution of a program by the CPU 51.

The mage control apparatus 32D according to this exemplary embodiment functions as the position detecting part 60, target person identifying parts 64A and 64B, moving direction detecting parts 61A and 61B, and image formation control parts 62A and 62B.

The target person identifying part 64A, the moving direction detecting part 61A, and the image formation control part 62A are functions for the aerial image 10A. The target person identifying part 64B, the moving direction detecting part 61B, and the image formation control part 62B are functions for the aerial image 10B.

The target person identifying part 64A and the target person identifying part 64B exchange information on identified target persons with each other to share the information. When the number of persons detected by the position detecting part 60 is one, the target person for the aerial image 10A is identical to the target person for the aerial image 10B.

When the number of persons detected by the position detecting part 60 is two or more, different persons are identified as the target person for the aerial image 10A and the target person for the aerial image 10B.

Even if the number of persons detected by the position detecting part 60 is two or more, the same person may be identified as the target person for the aerial image 10A and the target person for the aerial image 10B. Examples of this case include a case in which one person directs his or her line of sight to the aerial images 10A and 10B.

FIG. 23 is a flowchart for describing an overview of a processing operation to be executed by the image formation control parts 62A and 62B (see FIG. 22). Because of the overview, details differ depending on individual styles of use.

First, the image formation control parts 62A and 62B determine whether persons have been detected (Step 31).

When the result of Step 31 is NO, the image formation control parts 62A and 62B repeat the determination until persons are detected.

When the result of Step 31 is YES, the image formation control parts 62A and 62B identify the positions of the persons (Step 32).

Next, the image formation control parts 62A and 62B identify a person to be associated with the aerial image 10A and a person to be associated with the aerial image 10B (Step 33). As in the case of the second exemplary embodiment, a person closer to the aerial image than any other persons may be identified as the target person. Alternatively, a person who satisfies a predetermined condition may be identified as the target person. When the number of detected persons is one, this processing is not necessary.

Then, the image formation control parts 62A and 62B identify moving directions of the identified persons (Step 34).

Then, the image formation control parts 62A and 62B change the orientations or the contents of the aerial images 10A and 10B based on the identified moving directions (Step 35).

Examples of Formation of Aerial Images 10

Formation Example 1

FIG. 24 illustrates an example of formation of the aerial images 10A and 10B in the fourth exemplary embodiment.

FIG. 24 is a top view of the space where the aerial images 10A and 10B are formed. In the example of FIG. 24, the persons 207 and 20B are present around the aerial images 10A and 10B. Of the persons 20A and 20B, the person 20A is closer to the aerial image 10A than the person 20B and the person 20B is closer to the aerial image 10B than the person 20A. Therefore, the aerial image 10A is formed so as to face the person 20A who moves in the X-axis direction and the aerial image 10B is formed so as to face the person 20B who moves in the Y-axis direction.

FIGS. 25A and 25B illustrate another example of the formation of the aerial images 10A and 10B in the fourth exemplary embodiment. FIG. 25A is a top view of the space where the aerial images 10A and 10B are formed. FIG. 25B illustrates the aerial images 10A and 10B viewed from the position of the person 20A.

In the example of FIGS. 25A and 25B, the aerial image 10A and the aerial image 10B are formed side by side and the two display surfaces are combined to show a single picture. By rendering a single picture on the two display surfaces, the area where the person 20A may recognize the picture is doubled and the visibility may be increased.

Formation Example 2

Figure 26A:
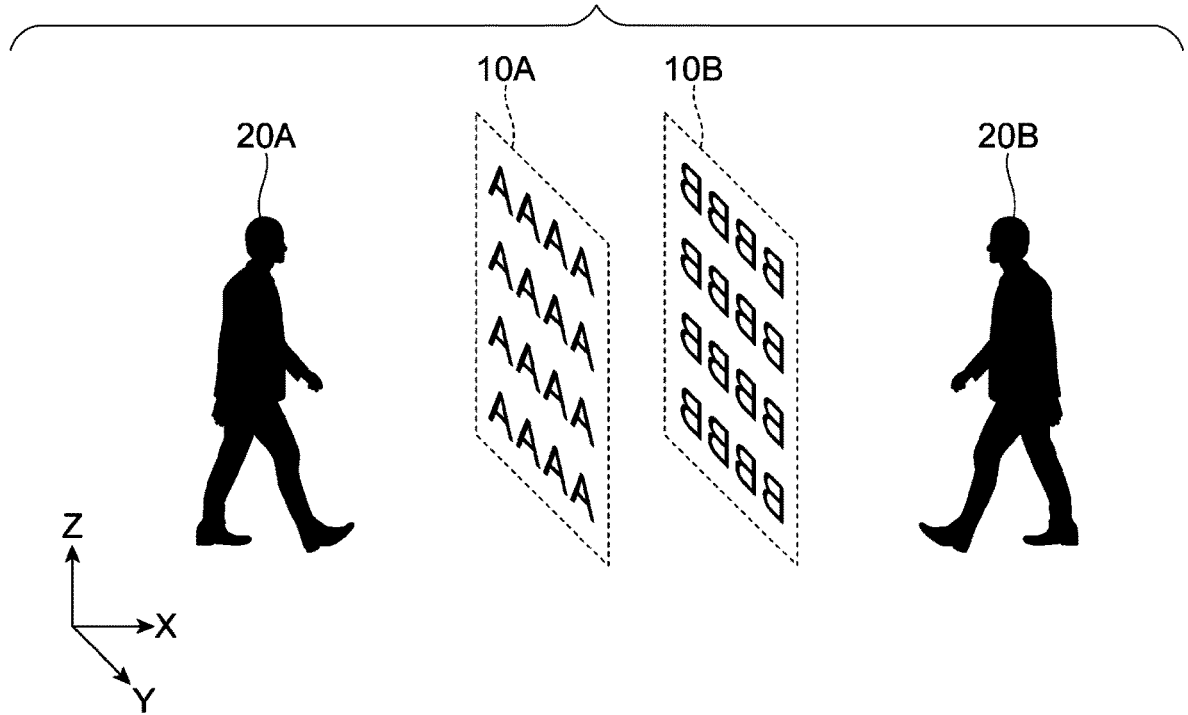
Figure 26B:
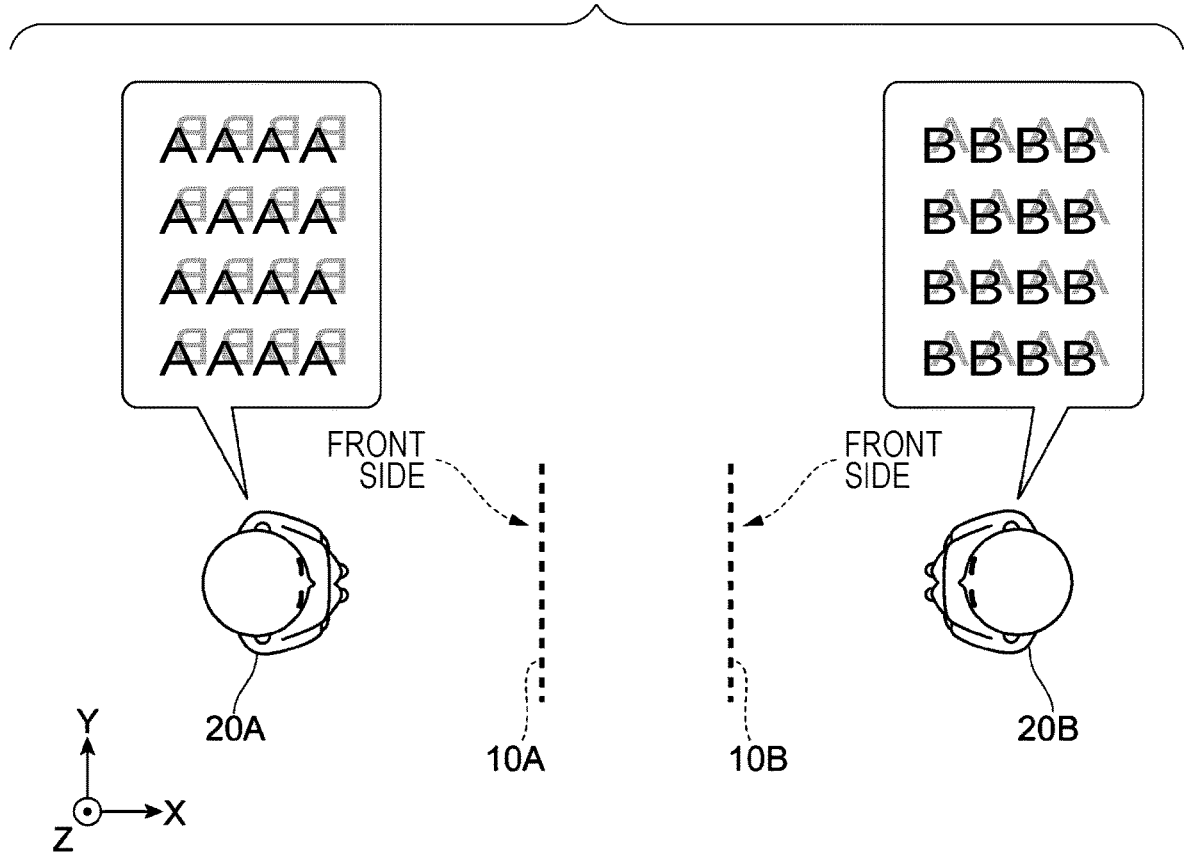

FIGS. 26A and 26B illustrate another example of the formation of the aerial images 10A and 10B in the fourth exemplary embodiment. FIG. 26A illustrates a state in which the person 20A and the person 20B are located across the aerial images 10A and 10B so as to face each other. FIG. 26B is a top view of the space where the aerial mages 10A and 10B are formed.

When the person 20A and the person 20B are located so as to face each other, the aerial image 10A and the aerial image 10B are also med so as to face each other.

Depending on the distance between the aerial image 10A and the aerial image 10B or the display contents thereof, the visibility may decrease because one image overlaps the other image.

For example, when the aerial images 10A and 10B are viewed from the position of the person 20A, the person 20A recognizes that the contents of the aerial image 10B located on a background side overlap the contents of the aerial image 10A located on a near side. For example, when the aerial images 10A and 10B are viewed from the position of the person 20B, the person 20B recognizes that the contents of the aerial image 10A located on a background side overlap the contents of the aerial image 10B located on a near side.

Figure 27A:
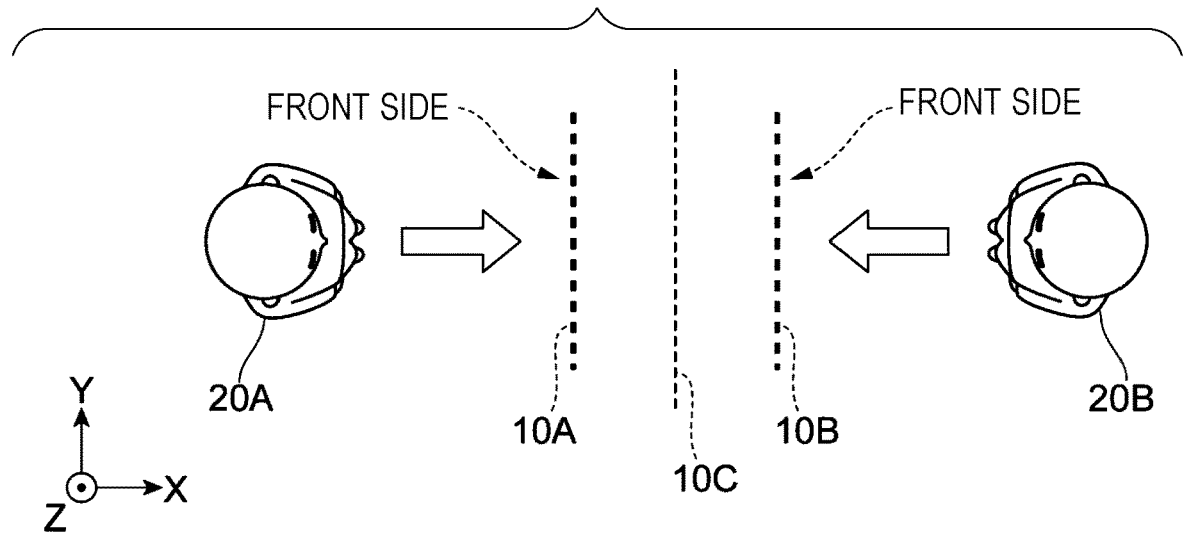
Figure 27B:
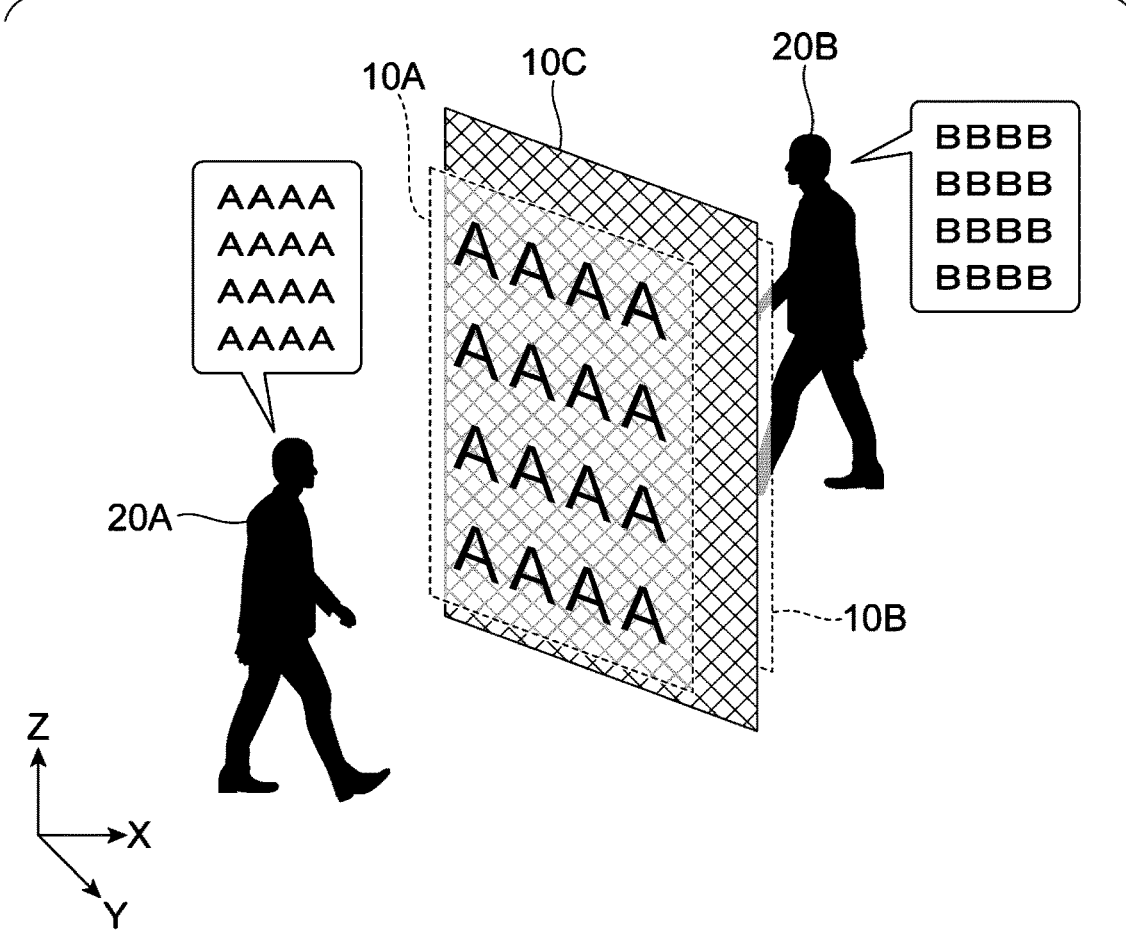

FIGS. 27A and 27B illustrate an example of a measure to increase the visibility. FIG. 27A is a top view of the space where the aerial images 10A and 10B are formed. FIG. 27B illustrates how the aerial images 10A and 10B are viewed from the person 20A and the person 20B.

FIGS. 27A and 27B illustrate a method for increasing the visibility of each of the aerial image 10A and the aerial image 10B by forming a third aerial image 10C between the aerial image 10A and the aerial image 10B.

Any image may be used as the aerial image 10C as long as the visibility of each of the aerial image 10A and the aerial image 10B is increased by forming the aerial image 10C. For example, an image having a uniform color or pattern in its entirety is used as the aerial image 10C. Any color may be used as long as the visibility of the aerial image 10A or 10B located on the near side is increased. For example, it is desirable to use a color having a complementary (opposite) relationship with a color tone that is used for displaying the aerial images 10A and 10B.

An image for increasing the contrast of each of the aerial images 10A and 10B may be used as the aerial image 10C. As the image for increasing the contrast, it is desirable to use, for example, an image in a color tone having a complementary (opposite) relationship with the color tone of each of the aerial images 10A and 10B.

By arranging the aerial image 10C, the visibility of each of the aerial images 10A and 10B is improved.

FIGS. 27A and 27B illustrate a case in which the dimensions of the aerial image 10C are larger than those of the aerial images 10A and 10B. Because of the large dimensions of the aerial image 10C, one of the aerial images 10A and 10B that is viewed from the other side across the aerial image 10C may be hidden by the aerial image 10C even if there a deviation of the positional relationship between the aerial images 10A and 10B.

Since the dimensions of the aerial image 10C are larger than the dimensions of the aerial images 10A and 10B, a visual effect analogous to a frame is attained, thereby increasing the visibility of each of the aerial images 10A and 10B.

Figure 28A:
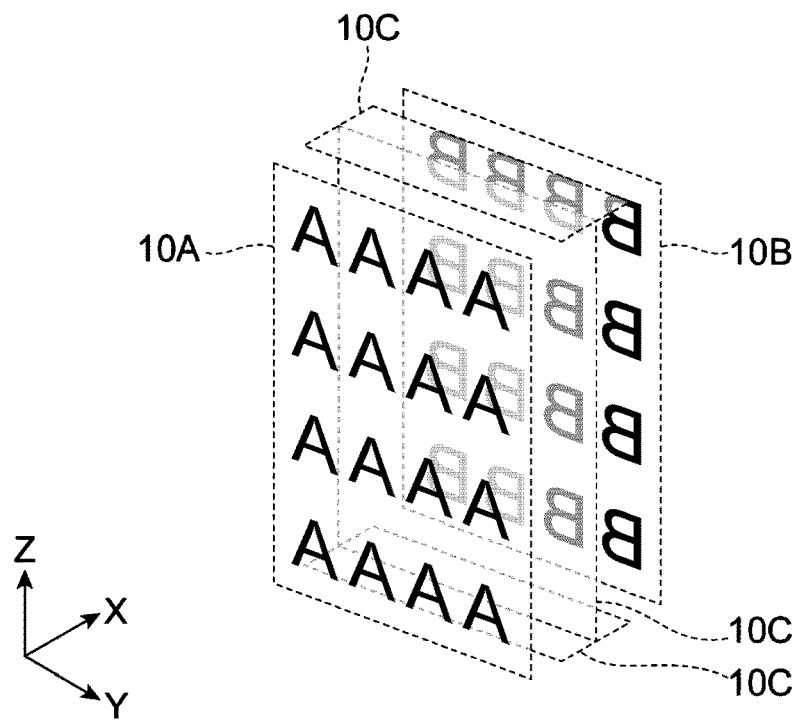
Figure 28B:
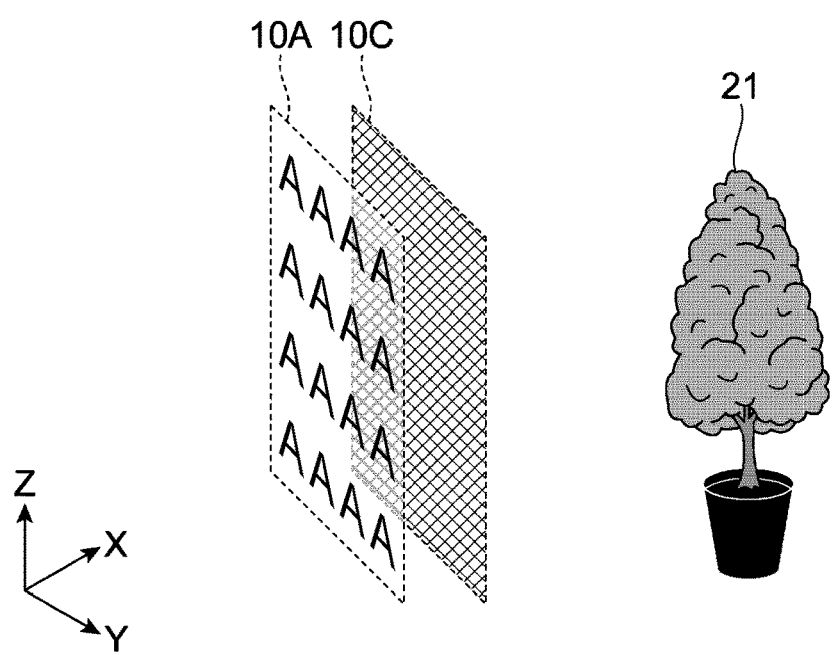

FIGS. 28A and 28B illustrate other examples of arrangement of the third aerial image 10C for increasing the visibility of each of the aerial mages 10A and 10B. FIG. 28A illustrates an example in which plural aerial images 10C are arranged between the aerial images 10A and 10B. FIG. 28B illustrates an example in which the aerial image 10C is arranged between the aerial image 10A and a plant 21 that is recognized as a background.

The example illustrated in FIG. 28A is a measure against a case in which a ceiling, a floor, or the like is recognized as a background of the aerial images 10A and 10B. In the example illustrated in FIG. 28A, the aerial images 10C are arranged on the ceiling side and on the floor side as well. As a measure against a case in which walls are recognized as backgrounds, two aerial images 10C may be arranged on both sides.

The example illustrated in FIG. 28B is an example in which the third aerial image 10C is arranged behind the aerial image 10A when an object existing in the space (plant 21 in this case) causes the decrease in the visibility of the aerial image 10A.

Fifth Exemplary Embodiment

Schematic Configuration of Aerial Image Forming System

Figure 29:
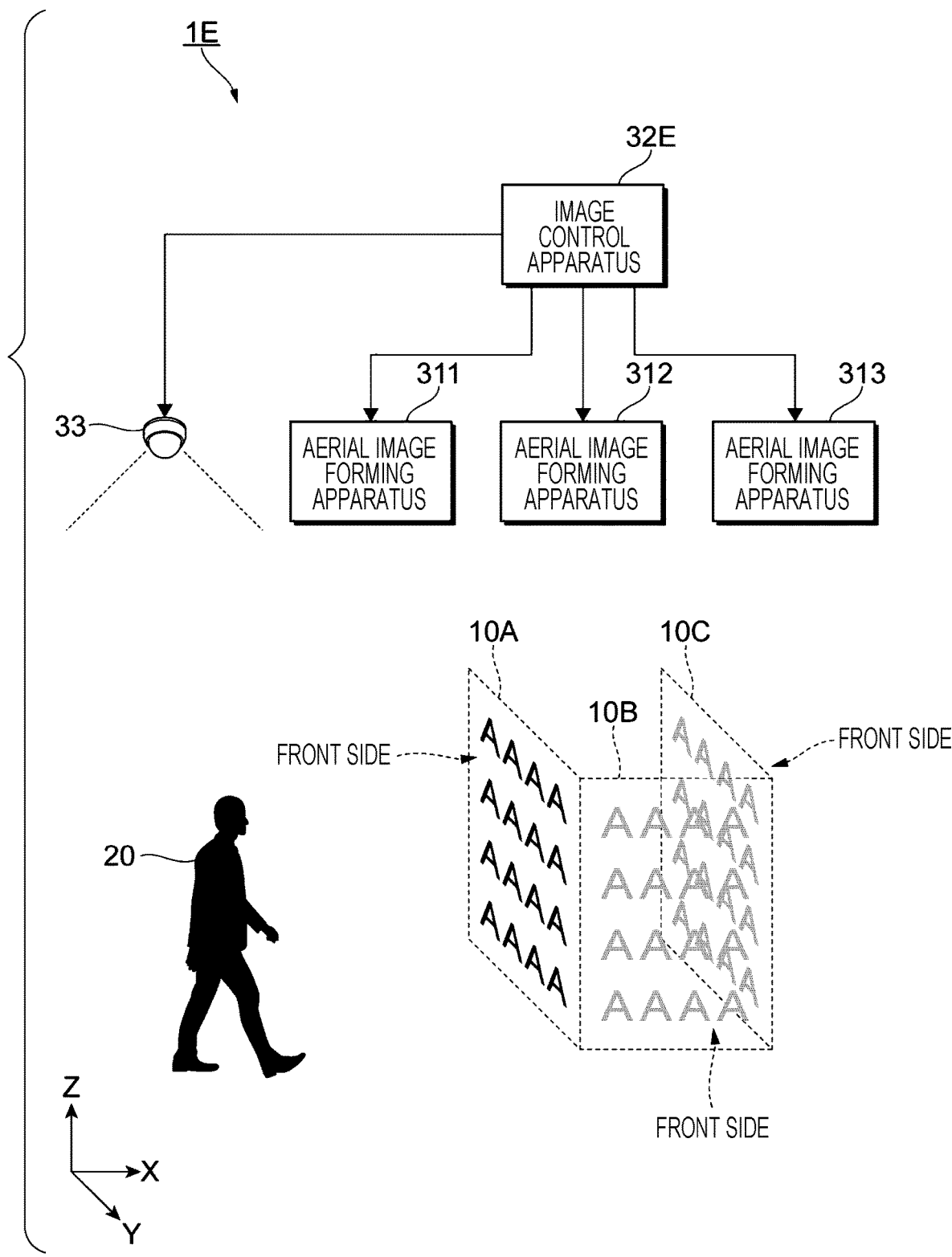
FIG. 29 illustrates the schematic configuration of an aerial image forming system according to a fifth exemplary embodiment.

FIG. 29 illustrates the schematic configuration of an aerial image forming system 13 according to a fifth exemplary embodiment. The aerial image forming system 1E is an example of the information processing system.

In FIG. 29, parts corresponding to those in FIG. 1 are denoted by the same reference symbols.

In this exemplary embodiment, description is given of a case in which the display contents are changed in accordance with the movement of the person 20 when three aerial images 10A to 10C are arranged.

This exemplary embodiment is an applied example of the control described in each of the first to third exemplary embodiments. For example, the display contents of the aerial images 10A to 10C are changed as in Step 4 (see FIG. 9), Step 15 (see FIG. 15), and Step 25 (see FIG. 19).

In the example illustrated in FIG. 29, the three aerial images 10A to 10C are arranged in a C-shape as viewed from a ceiling side. The aerial images 10A to 10C are formed by using aerial image forming apparatuses 311 to 313.

In the case of FIG. 29, a still screen that reads "AAAA/AAAA/AAAA/AAAA" as its contents is displayed in each of the three aerial images 10A to 10C.

In FIG. 29, the person 20 faces the aerial image 10A.

FIG. 29 illustrates a state in which the brightness levels of the aerial image 10B and the aerial image 10C are reduced in order to increase the visibility for the person 20. The brightness level of the aerial image 10A that faces the person 20 may be set higher than the brightness levels of the aerial images 10B and 10C.

Figure 30:
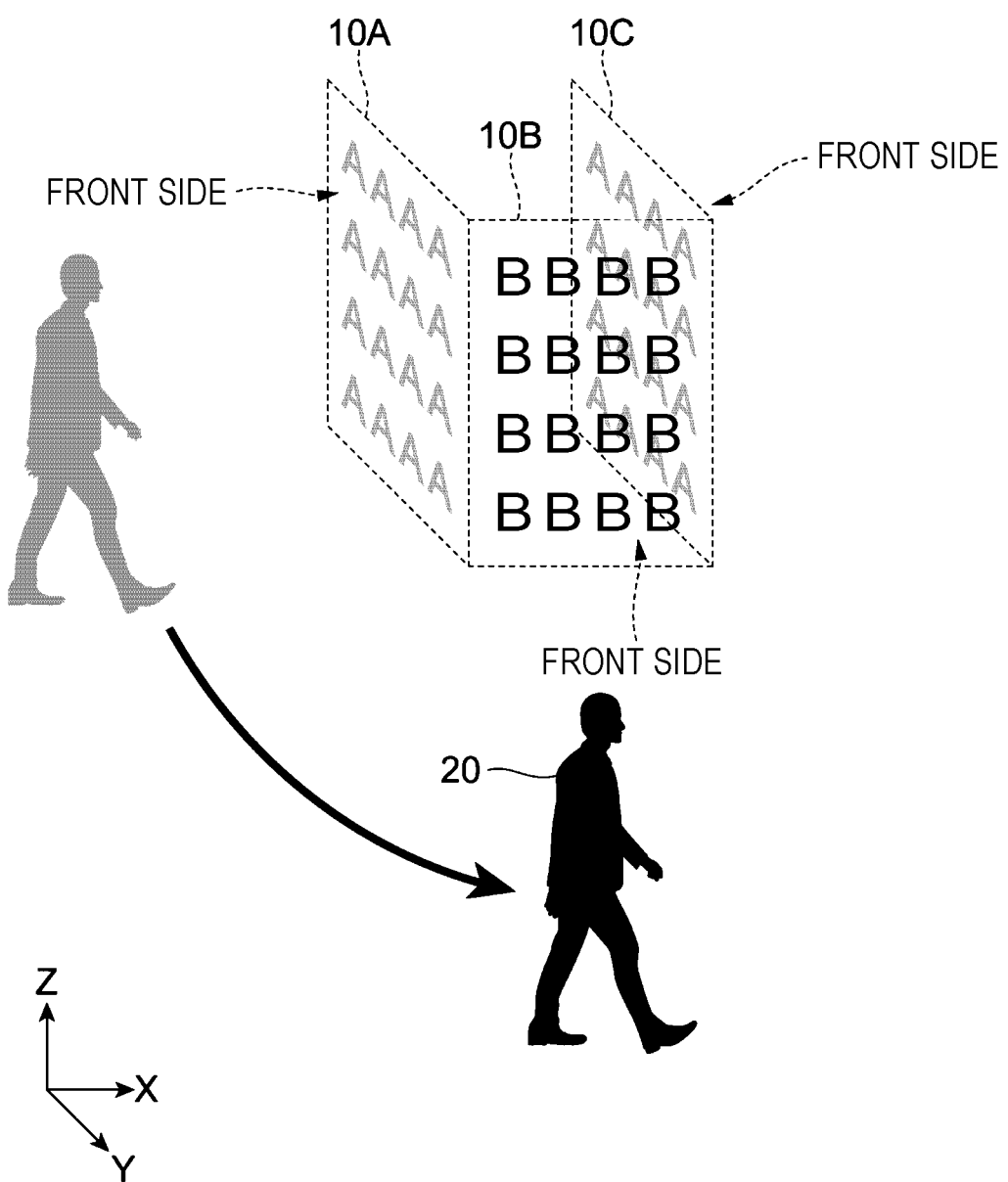
FIG. 30 illustrates a change of contents in a state in which a person has moved to the position of a second aerial image.

FIG. 30 illustrates a change of the contents in a state in which the person 20 has moved to the position of the second aerial image 10B.

In FIG. 30, the contents of the aerial image 10B are changed to a still image that reads "BBBB/BBBB/BBBB/BBBB".

The contents of the aerial image 10C are the same as those in its initial state but may be changed in accordance with the contents of the aerial image 10B.

Figure 31:
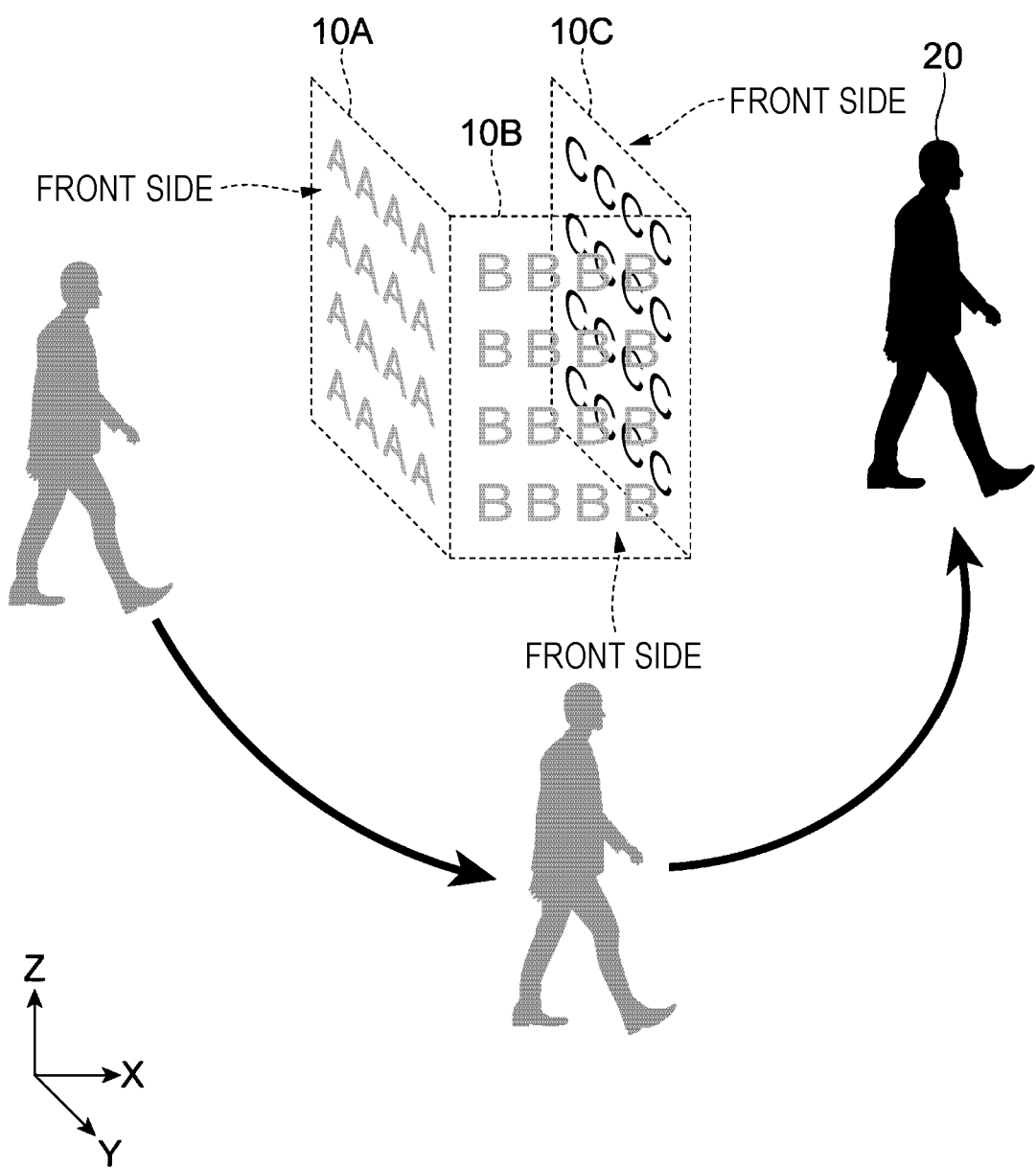
FIG. 31 illustrates a change of contents in a state in which the person has moved to the position of a third aerial image.

FIG. 31 illustrates a change of the contents in a state in which the person 20 has moved to the position of the third aerial image 10C.

In FIG. 31, the contents of the aerial image 10C are changed to a still image that reads "CCCC/CCCC/CCCC/CCCC".

As described above, the displaying of the aerial image 10B is changed from "AAAA/AAAA/AAAA/AAAA" to "BBBB/BBBB/BBBB/BBBB" along with the movement of the person 20 and the displaying of the aerial image 10C is changed from "AAAA/AAAA/AAAA/AAAA" to "CCCC CCCC/CCCC/CCCC" along with the movement of the person 20.

In other words, the aerial image forming system 1B performs control so as to sequentially increase the visibilities of the aerial images 10A to 10C to be recognized along with the movement of the person 20.

The contents to be displayed in the aerial images 10A to 10C are not limited to the still image.

Figure 32A:
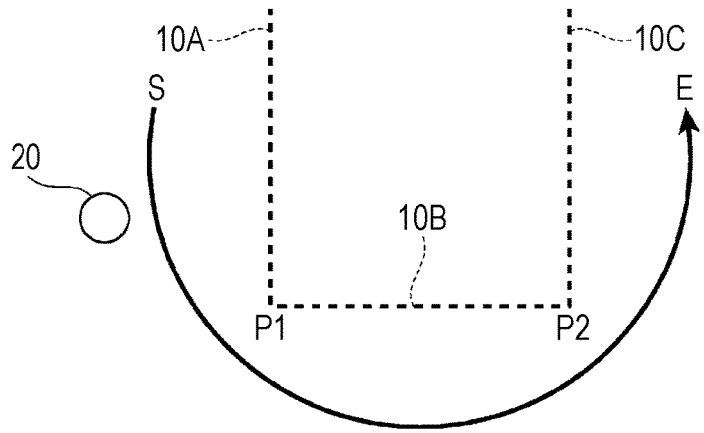
FIGS. 32A to 32D illustrate contents of a moving image to be reproduced in the respective aerial images along with the movement of the person.
Figure 32B:
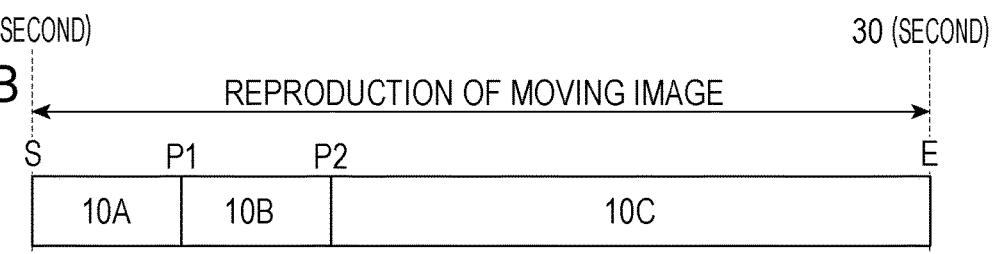
Figure 32C:
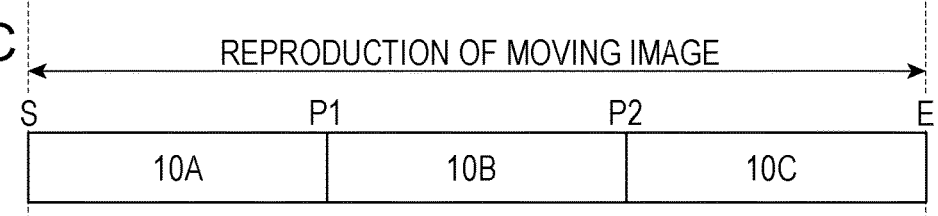
Figure 32D:
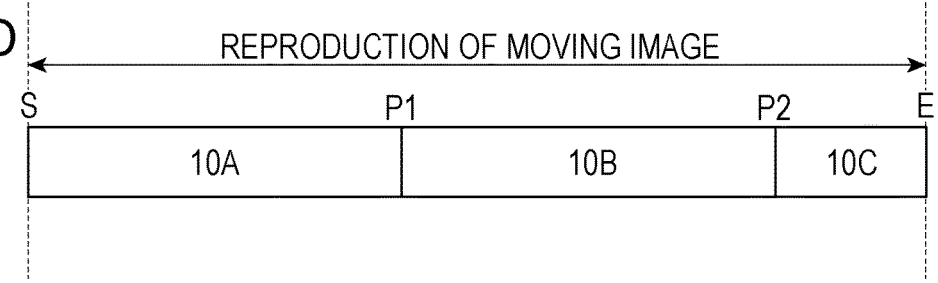

FIGS. 32A to 32D illustrate contents of a moving image to be reproduced in the aerial images 10A to 10C along with the movement of the person 20. FIG. 32A illustrates a positional relationship among the aerial images 10A to 10C and a movement path of the person 20. FIGS. 32B to 32D illustrate timings to change the display contents in accordance with the moving speed of the person 20.

The symbol S represents a start point of movement and the symbol E represents an end point of movement. The symbol P1 represents a boundary between the aerial image 10A and the aerial image 10B and the symbol P2 represents a boundary between the aerial image 10B and the aerial image 10C.

The example illustrated in FIG. 32B is directed to a case in which the person 20 has passed by the front of the aerial image 10A and the front of the aerial image 10B in a short time. The moving image displayed in the aerial image 10A and the aerial image 10B corresponds to a first part of about 10 seconds in the total of 30 seconds.

The example illustrated in FIG. 32C is directed to a case in which the person 20 is evenly located in front of the aerial images 10A to 10C. The moving image displayed in each of the aerial images 10A to 10C corresponds to about 10 seconds.

The example illustrated in FIG. 32D is directed to a case in which the person 20 has passed slowly by the front of the aerial image 10A and the front of the aerial image 10B. The moving image displayed in the aerial image 10C corresponds to the last part of about 5 seconds in the total of 30 seconds.

Also when the moving image is displayed, it is desirable to control the brightness levels of the aerial images so as to increase the visibility of the aerial image that faces the person 20.

Figure 33:
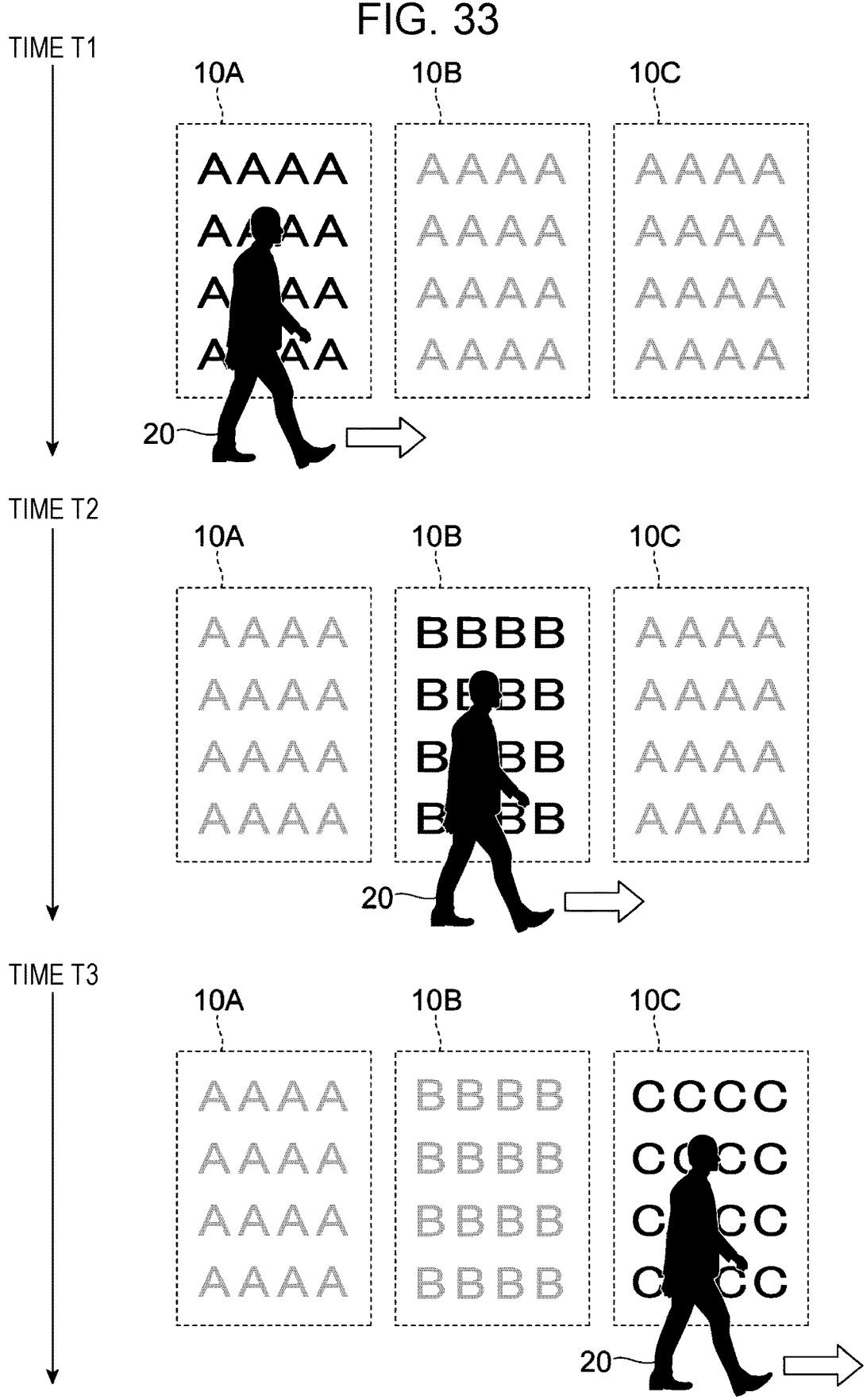
FIG. 33 illustrates another display example for increasing the visibility of each of the aerial images.

FIG. 33 illustrates another display example for increasing the visibility of each of the aerial images 10A to 10C.

The control in the example illustrated in FIG. 33 is similar to the control described with reference to FIGS. 29 to 32D except that the three aerial images 10A to 10C are arranged in a lateral direction.

Sixth Exemplary Embodiment

Schematic Configuration of Aerial Image Forming System

In this exemplary embodiment, description is given of a case in which a function of receiving an output instruction for the aerial image is added to each of the aerial image forming systems described above.

Figure 34:
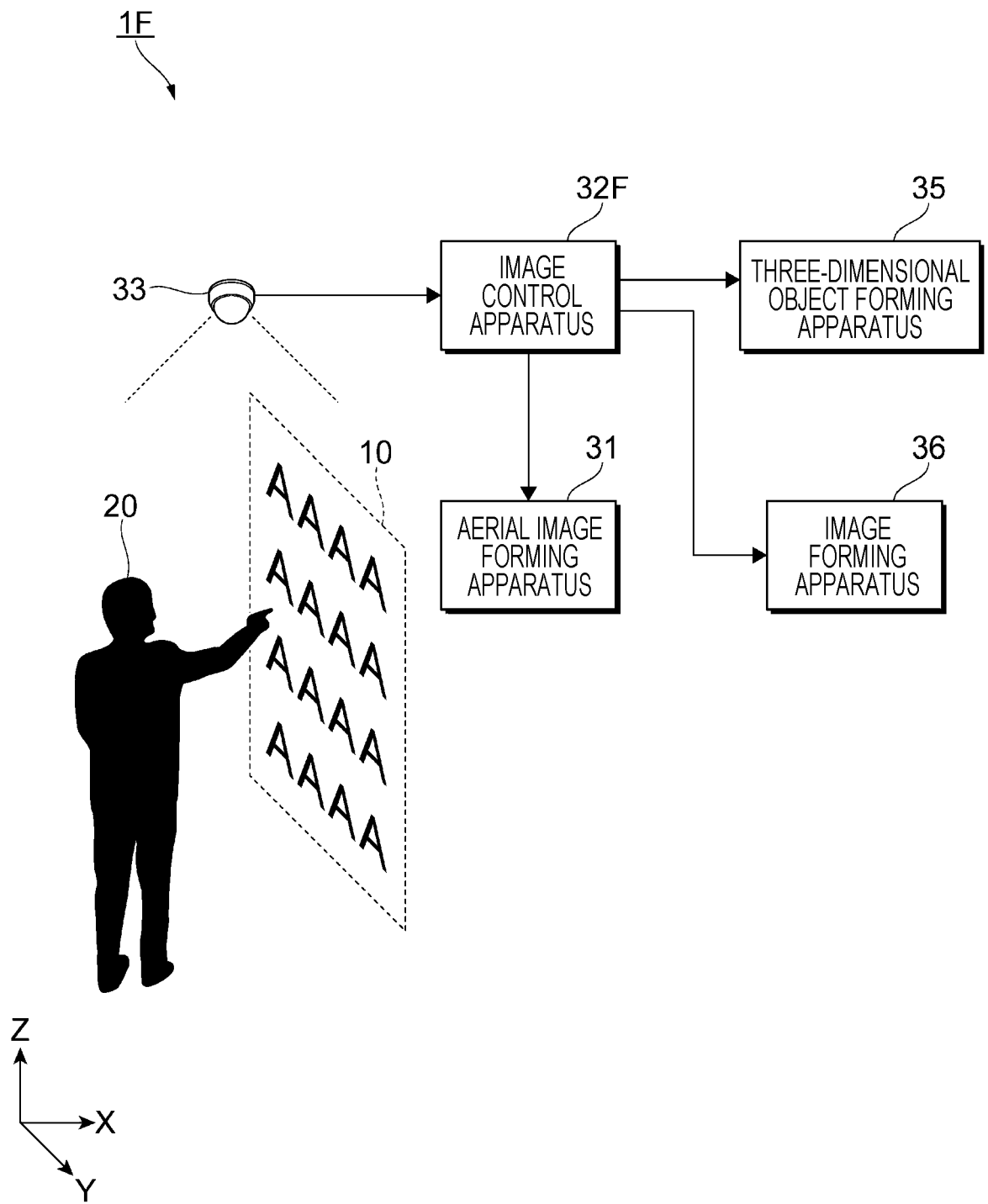
FIG. 34 illustrates the schematic configuration of an aerial image forming system according to a sixth exemplary embodiment.

FIG. 34 illustrates the schematic configuration of an aerial image forming system IF according to the sixth exemplary embodiment. The aerial image forming system 1F is an example of the information processing system.

In FIG. 34, parts corresponding to those in FIG. 1 are denoted by the same reference symbols.

The aerial image forming system 1F includes the aerial image forming apparatus 31 that forms the aerial image 10 in the air, an image control apparatus 32F that controls the aerial image forming apparatus 31, the position detecting sensor 33 that detects the position of the person 20, a three-dimensional object forming apparatus 35, and an image forming apparatus 36.

The image control apparatus 32F has the hardware configuration illustrated in FIG. 7. The image control apparatus 32F is an example of the controller and is also an example of the information processing apparatus.

The three-dimensional object forming apparatus 35 is an apparatus that forms a three-dimensional object by a method such as stereolithography that involves gradually curing a liquid resin by radiating an ultraviolet ray or the like, fused deposition modeling (FDM) that involves gradually depositing a fused resin, or powder bed binding that involves jetting an adhesive to a powder resin.

The image forming apparatus 36 is an apparatus that forms an image on a recording material such as paper. Examples of the image forming apparatus 36 include a printer that prints an image on paper by a laser or ink jet system.

Figure 35:
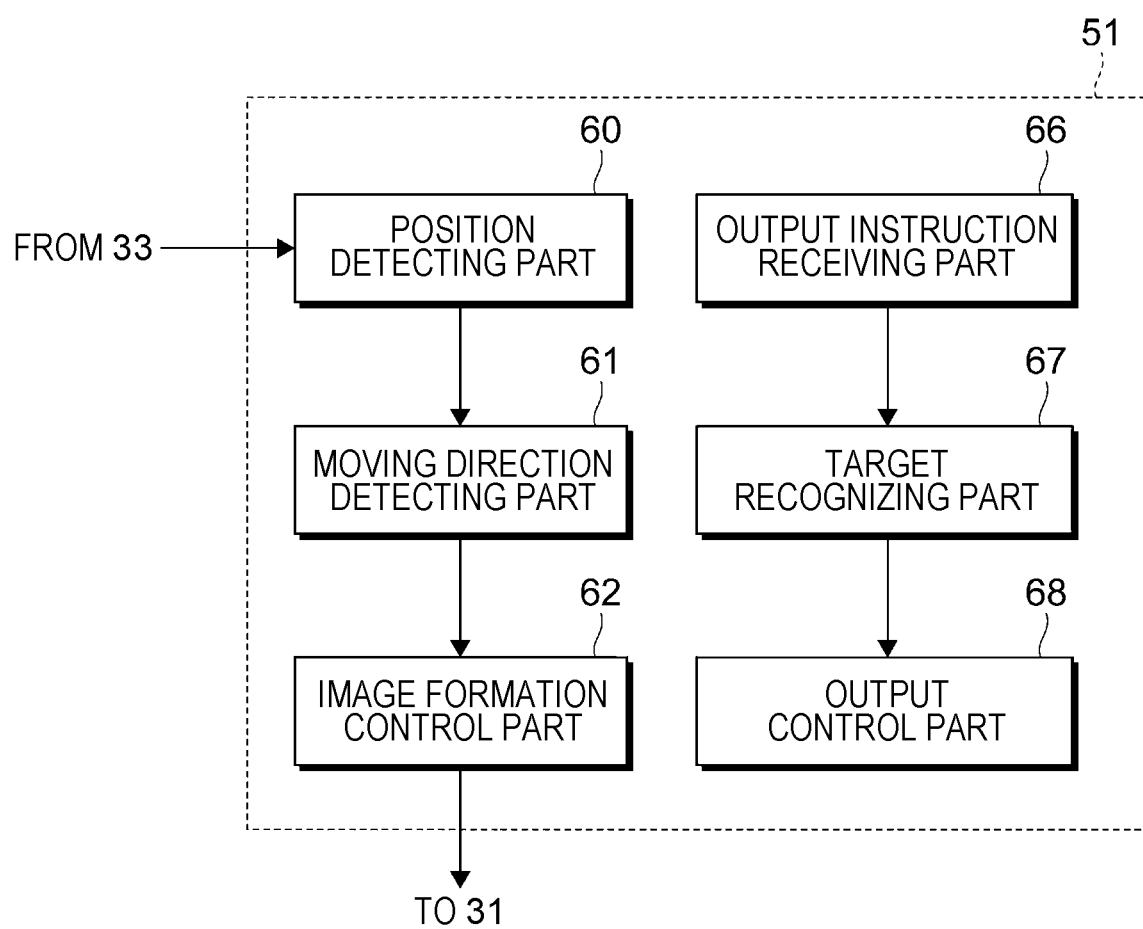
FIG. 35 illustrates an example of the functional configuration of an image control apparatus according to the sixth exemplary embodiment.

FIG. 35 illustrates an example of the functional configuration of the image control apparatus 32F (see FIG. 34) according to the sixth exemplary embodiment.

In FIG. 35, parts corresponding to those in FIG. 8 are denoted by the same reference symbols.

The functional configuration illustrated in FIG. 35 is implemented through execution of a program by the CPU 51.

The image control apparatus 32F according to this exemplary embodiment functions as the position detecting part 60, the moving direction detecting part 61, the image formation control part 62, an output instruction receiving part 66 that receives an output instruction for the aerial image, a target recognizing part 67 that recognizes the type of the aerial image subjected to the output instruction, and an output control part 68 that controls an output operation based on a recognition result.

Of those functions, the output instruction receiving part 66, the target recognizing part 67, and the output control part 68 are functions unique to this exemplary embodiment.

The output instruction receiving part 66 is a functional part that receives an output instruction for the aerial image 10 (see FIG. 34) from the person 20 (see FIG. 34). The output instruction is received by, for example, recognizing a captured image of a gesture made by the person 20. The output instruction may be received by detecting a line of sight of the person 20, by analyzing a voice, or by receiving a signal from a device such as a controller.

The target recognizing part 67 is a functional part that executes processing of recognizing the type of the aerial image 10 to be output. In this exemplary embodiment, three types that are a document, a three-dimensional object, and a type that does not correspond to the document or the three-dimensional object (that is, other object) are assumed as the types of the aerial image 10. With the type of the aerial image 10, the output format may roughly be identified.

For example, in a case of a document defined by two-dimensional information, there is a high probability that the document may be output as an electronic file or printed on paper.

For example, in a case of a three-dimensional object defined by three-dimensional information, there is a high probability that the three-dimensional object may be formed by three-dimensional modeling or the outer peripheral surfaces in specific directions may sequentially be printed on paper.

The type may be recognized by focusing on a form recognized by the person 20 or by focusing on a data structure that is used for forming the aerial image 10. In the latter case, for example, the type is recognized as a three-dimensional object when the aerial image 10 is recognized as a two-dimensional image but the corresponding data is three-dimensional data.

Examples of the three-dimensional data include data conforming to Standard Triangulated Language (STL) in which a three-dimensional shape is represented as an aggregate of triangles, data in which a three-dimensional shape is represented as an aggregate of voxels, and computer aided design (CAD) data.

The output control part 68 is a functional part that identifies an output format based on a recognition result or an additional instruction from the person and controls an output operation that uses the identified format.

Figure 36:
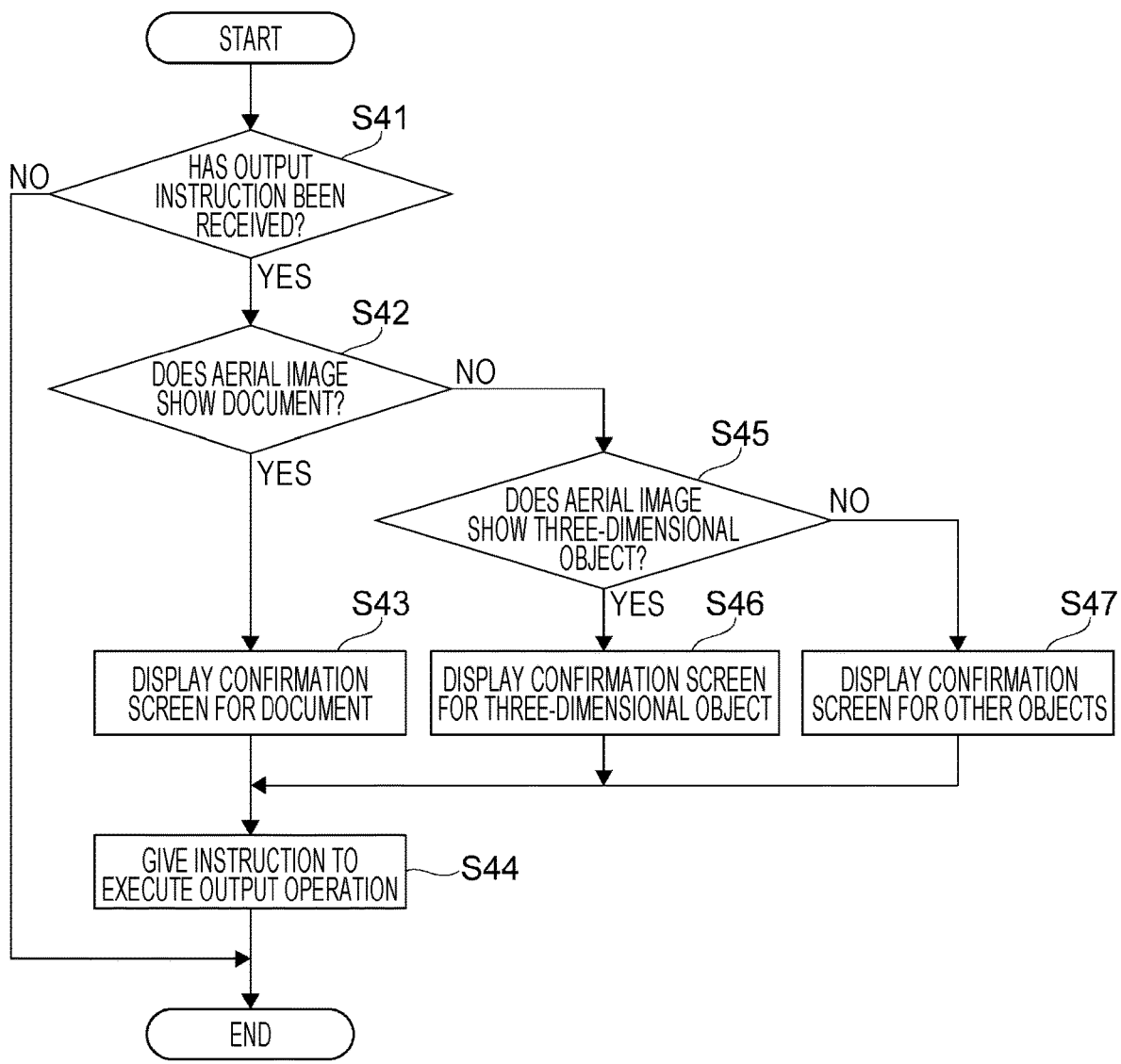
FIG. 36 is a flowchart for describing an overview of a processing operation according to the sixth exemplary embodiment.

FIG. 36 is a flowchart for describing an overview of a processing operation according to the sixth exemplary embodiment. Because of the overview, details differ depending on individual styles of use.

The output instruction receiving part 66 (see FIG. 35) determines whether an output instruction has been received from a person (Step 41).

When the result of Step 41 is NO, the output instruction receiving part 66 terminates the processing. The output instruction receiving part 66 may repeat the determination until the result becomes YES.

When the result of Step 41 is YES, the target recognizing part 67 determines whether an aerial image shows a document (Step 42). The target recognizing part 67 acquires information on data that is used for forming the aerial image through communication with the aerial image forming apparatus 31 (see FIG. 34).

For example, when two-dimensional data is used for forming the aerial image, the target recognizing part 67 recognizes the aerial image as a document. That is, the result of Step 42 is YES.

When the result of Step 42 is YES, the target recognizing part 67 displays a confirmation screen for the document (Step 43). In the case of this exemplary embodiment, the confirmation screen is formed as an aerial image but may be displayed on a display device provided in the information processing apparatus.

FIG. 37 illustrates an example of execution of an output operation when the aerial image 10 shows the document. In FIG. 37, plural pages are represented as a two-dimensional image.

When the aerial image 10 shows the document, candidates are displayed on a confirmation screen W1. That is, two items "OUTPUT AS ELECTRONIC FILE" and "PRINT ON PAPER" are displayed as selection candidates. Various methods are conceivable to select a candidate. For example, an area where the candidate is displayed is selected with a finger or hand.

When the item "OUTPUT AS ELECTRONIC FILE" is selected, the target recognizing part 67 gives an instruction to output the document as an electronic file 100. The electronic file 100 may be generated by the image control apparatus 32F (see FIG. 34), by the aerial image forming apparatus 31 (see FIG. 34), or by an information processing apparatus (not illustrated) (for example, a computer) that provides two-dimensional data to the aerial image forming apparatus 31.

When the item "PRINT ON PAPER" is selected, the target recognizing part 67 gives an instruction to print the image on paper 101.

When the output format is set in advance, the target recognizing part 67 may give an instruction to output the electronic file 100 or print the image on the paper 101 without displaying the confirmation screen W1.

When a desired candidate is not present in the confirmation screen W1, the target recognizing part 67 displays other candidates through another confirmation screen W2. In FIG.

37, items "OUTPUT AS THREE-DIMENSIONAL OBJECT" and "PRINT AS PANORAMA" are displayed as candidates.

Description is given again with reference to FIG. 36.

When an instruction is received on the confirmation screen displayed in Step 43, the output control part 68 gives an instruction to execute an output operation (Step 44).

When the result of Step 42 is NO, the target recognizing part 67 determines whether the aerial image shows a three-dimensional object (Step 45).

When the result of Step 45 is YES, the target recognizing part 67 displays a confirmation screen for the three-dimensional object (Step 46).

FIG. 38 illustrates an example of execution of an output operation when the serial image 10 shows the three-dimensional object.

When the aerial image 10 shows the three-dimensional object, text for confirming whether to output the three-dimensional object is displayed on a confirmation screen W3.

When "YES" is selected, the target recognizing part 67 gives an instruction to form a three-dimensional object 110. That is, the operation proceeds to the processing of Step 44 (see FIG. 36) In this case, the three-dimensional object forming apparatus 35 forms the three-dimensional object based on a corresponding method. When "NO" is selected, the target recognizing part 67 displays other candidates through mother confirmation screen W4. In FIG. 38, items "OUTPUT AS ELECTRONIC FILE" and "PRINT ON PAPER" are displayed as candidates.

Description is given again with reference to FIG. 36.

When an instruction is received on the confirmation screen displayed in Step 46, the output control part 68 gives an instruction to execute an output operation (Step 44).

When the result of Step 45 is NO, the target recognizing part displays a confirmation screen for other objects (Step 47).

For example, the other object is an object having two-dimensional data and three-dimensional data mixed in the aerial image 10.

Figure 39:
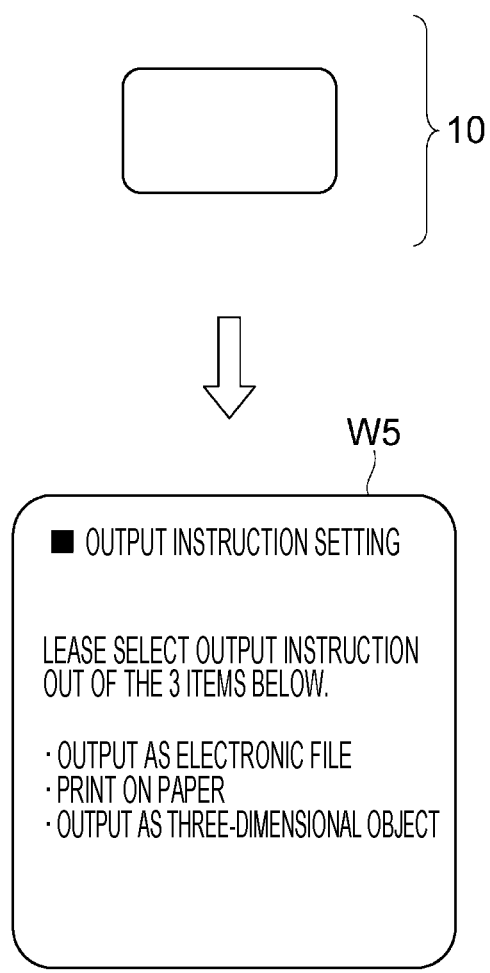
FIG. 39 illustrates an example of execution of an output operation when the aerial image is recognizable neither as a document nor as a three-dimensional object.

FIG. 39 illustrates an example of execution of an output operation when the aerial image 10 is recognizable neither as a document nor as a three-dimensional object.

When the aerial image 10 is recognizable neither as a document nor as a three-dimensional object, candidates are displayed on a confirmation screen W5. That is, three items "OUTPUT AS ELECTRONIC FILE", "PRINT ON PAPER", and "OUTPUT AS THREE-DIMENSIONAL OBJECT" are displayed as selection candidates.

Description is given again with reference to FIG. 36.

When an instruction is received on the confirmation screen displayed in Step 47, the output control part 68 gives an instruction to execute an output operation (Step 44).

FIG. 40 illustrates an example of an operation when the output operation for the aerial images 10A and 10B is printing on the paper 101.

FIG. 40 illustrates an example of printing on the paper 101 when the third aerial image 10C is formed between the aerial image 10A and the aerial image 10B in order to increase the visibility of each of the aerial images 10A and 10B.

FIG. 40 exemplifies two types that are printing that does not use the aerial image 10C (printing without that aerial image 10C) and printing that uses the aerial image 10C (printing with the aerial image 10C).

When the printing without the aerial image 10C is selected, images corresponding to the aerial image 10A and the aerial image 10B are printed on two sheets of paper 101.

When the printing with the aerial image 10C is selected, in the example of FIG. 40, the aerial image 10C is printed as a frame 102 for each of the aerial image 10A and the aerial image 10B. By printing the aerial image 10C as a frame, each of the aerial image 10A and the aerial image 10B printed inside the frame may become conspicuous.

The technology according to this exemplary embodiment is summarized as a recognition unit that recognizes the type of an aerial image formed in the air and an identification unit that identifies an output format of the aerial image based on the recognized type.

The target recognizing part 67 described above (see FIG. 35) is an example of the recognition unit and the identification unit.

By using this technology, an output operation that uses the format based on the type of the aerial image formed in the sir is achieved easily. The type of the aerial image may be recognized based on a form recognized in the air or based on a data structure that is used for forming the aerial image.

Other Exemplary Embodiments

The first to fifth exemplary embodiments described above are directed to the case in which the aerial image 10 is only formed into a planar shape. As described in the sixth exemplary embodiment, the first to fifth exemplary embodiments are also applicable to the case in which the aerial image 10 is formed as a three-dimensional image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a detector that detects a direction of movement of a user relative to an image formed in the air,
wherein a front side of the image faces the user at a first position of a plurality of positions of the user; and
a controller configured to:
based on the detected direction as the user moves from the first position to a second position, causes an orientation of the front side of the image to rotate about an imaginary rotation axis in an XY plane in correspondence with the direction of movement of the user in the XY plane;
during rotation of the image about the rotation axis in the XY plane, change display contents of the image in accordance with the movement of the user;
when a plurality of users moving in a plurality of different directions approach a plurality of images formed in air, cause the plurality of images to be formed in the air so as to face the respective users, the plurality of images including a first aerial image and a second aerial image; and cause a third aerial image to be formed between the first aerial image and the second aerial image, the third aerial image being a different image that is formed in the air for increasing a visibility of the first aerial image and the second aerial image.

2. The information processing apparatus according to claim 1, wherein the controller causes the image to be formed based on a direction of movement of a first user closer to the image than a second user.

3. The information processing apparatus according to claim 1, wherein, when the user is located within a predetermined range, the controller changes a direction in which the image is formed.

4. The information processing apparatus according to claim 1, wherein the different image has a uniform color or a uniform pattern in an entirety of the image.

5. The information processing apparatus according to claim 1, wherein the different image increases a contrast of each of the plurality of images.

6. The information processing apparatus according to claim 1, wherein the controller controls display contents to continue among the plurality of images.

7. An information processing system, comprising:
an image forming unit that forms an image in the air, wherein a front side of the image faces a user at a first position of a plurality of positions of the user;
a detector that detects a direction of movement of a user relative to the image; and
a controller configured to:
based on the detected direction as the user moves from the first position to a second position, causes an orientation of the front side of the image to rotate about an imaginary rotation axis in an XY plane in correspondence with the direction of movement of the user in the XY plane;
during rotation of the image about the rotation axis in the XY plane, change display contents of the image in accordance with the movement of the user;
when a plurality of users moving in a plurality of different directions approach a plurality of images formed in air, cause the plurality of images to be formed in the air so as to face the respective users, the plurality of images including a first aerial image and a second aerial image; and
cause a third aerial image to be formed between the first aerial image and the second aerial image, the third aerial image being a different image that is formed in the air for increasing a visibility of the first aerial image and the second aerial image.

8. A non-transitory computer readable medium storing a program causing a computer to execute a process comprising:
detecting a direction of movement of a user relative to an image formed in the air,
wherein a front side of the image faces the user at a first position of a plurality of positions of the user; and
controlling, based on the detected direction as the user moves from the first position to a second position, an orientation of the front side of the image so as to rotate about an imaginary rotation axis in an XY plane in correspondence with the direction of movement of the user in the XY plane; and
during rotation of the image about the rotation axis in the XY plane, changing display contents of the image in accordance with the movement of the user;
when a plurality of users moving in a plurality of different directions approach a plurality of images formed in air, causing the plurality of images to be formed in the air so as to face the respective users, the plurality of images including a first aerial image and a second aerial image; and
causing a third aerial image to be formed between the first aerial image and the second aerial image, the third aerial image being a different image that is formed in the air for increasing a visibility of the first aerial image and the second aerial image.

\* \* \* \* \*